United States Patent
Tang et al.

(10) Patent No.: US 9,507,126 B2
(45) Date of Patent: Nov. 29, 2016

(54) OPTICAL IMAGING SYSTEM, IMAGE CAPTURING UNIT AND ELECTRONIC DEVICE

(71) Applicant: LARGAN Precision Co., Ltd., Taichung (TW)

(72) Inventors: Hsiang-Chi Tang, Taichung (TW); Lin-Yao Liao, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/607,213

(22) Filed: Jan. 28, 2015

(65) Prior Publication Data

US 2016/0187619 A1  Jun. 30, 2016

(30) Foreign Application Priority Data

Dec. 29, 2014 (TW) .............................. 103146107 A

(51) Int. Cl.
    G02B 9/62 (2006.01)
    G02B 3/02 (2006.01)
    G02B 13/00 (2006.01)

(52) U.S. Cl.
    CPC ................. G02B 13/0045 (2013.01)

(58) Field of Classification Search
    USPC ................................. 359/713, 757
    See application file for complete search history.

(56) References Cited

U.S. PATENT DOCUMENTS

| 2015/0168686 A1 | 6/2015 | Nishihata et al. |
| 2015/0253541 A1 | 9/2015 | Hsu et al. |
| 2015/0260954 A1 | 9/2015 | Ota et al. |

FOREIGN PATENT DOCUMENTS

| CN | 103969811 A | 8/2014 |
| CN | 103984084 A | 8/2014 |
| JP | 2014044373 A | 3/2014 |
| TW | 201326883 A | 7/2013 |
| TW | 201333575 A | 8/2013 |
| TW | 201405162 A | 2/2014 |
| TW | 201437673 A | 10/2014 |
| WO | 2014006822 A1 | 1/2014 |

*Primary Examiner* — Jack Dinh
(74) *Attorney, Agent, or Firm* — Maschoff Brennan

(57) ABSTRACT

An optical imaging system includes, in order from an object side to an image side, a first lens element, a second lens element, a third lens element, a fourth lens element, a fifth lens element and a sixth lens element. The first lens element with positive refractive power has an object-side surface being convex in paraxial region. The second lens element has refractive power. The third lens element has positive refractive power. The fourth lens element has refractive power. The fifth lens element with refractive power has an image-side surface being concave in a paraxial region, wherein an object-side surface and the image-side surface are both aspheric. The sixth lens element with refractive power has an image-side surface being concave in a paraxial region, wherein an object-side surface and the image-side surface are both aspheric, and the image-side surface has at least one convex shape in an off-axis region.

28 Claims, 19 Drawing Sheets

OPTICAL IMAGING SYSTEM, IMAGE CAPTURING UNIT AND ELECTRONIC DEVICE

RELATED APPLICATIONS

This application claims priority to Taiwan Application 103146107, filed Dec. 29, 2014, which is incorporated by reference herein in its entirety.

BACKGROUND

Technical Field

The present disclosure relates to an optical imaging system, an image capturing unit and an electronic device, more particularly to an optical imaging system and an image capturing unit applicable to an electronic device.

Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a five-element lens structure. Due to the popularity of mobile terminals with high-end specifications, such as smart phones, wearable apparatus and tablet personal computers, the requirements for high resolution and image quality of present compact optical systems increase significantly. However, the conventional optical systems cannot satisfy these requirements of the compact optical systems.

Other conventional compact optical systems with six-element lens structure are developed to satisfy the requirements for large aperture. However, a total track length of the optical system including a large aperture is overly large so that it is unfavorable for satisfying the requirements for large aperture and keeping the optical system compact simultaneously.

SUMMARY

According to one aspect of the present disclosure, an optical imaging system includes, in order from an object side to an image side, a first lens element, a second lens element, a third lens element, a fourth lens element, a fifth lens element, and a sixth lens element. The first lens element with positive refractive power has an object-side surface being convex in a paraxial region thereof. The second lens element has refractive power. The third lens element has positive refractive power. The fourth lens element has refractive power. The fifth lens element with refractive power has an image-side surface being concave in a paraxial region thereof, wherein both of an object-side surface and the image-side surface of the fifth lens element are aspheric. The sixth lens element with refractive power has an image-side surface being concave in a paraxial region thereof, wherein the image-side surface of the sixth lens element has at least one convex shape in an off-axis region thereof, and both of an object-side surface and the image-side surface of the sixth lens element are aspheric. The optical imaging system has a total of six lens elements with refractive power. The first lens element, the second lens element, the third lens element, the fourth lens element, the fifth lens element and the sixth lens element are all stationary relative to one another in a paraxial region thereof. An air gap in a paraxial region is between every two of the first lens element, the second lens element, the third lens element, the fourth lens element, the fifth lens element and the sixth lens element that are adjacent to each other. The optical imaging system further comprises a stop located between an imaged object and the third lens element. When a maximum effective radius of the image-side surface of the sixth lens element is SD62, an entrance pupil diameter of the optical imaging system is EPD, a focal length of the first lens element is f1, a focal length of the third lens element is f3, an axial distance between the object-side surface of the first lens element and the image-side surface of the sixth lens element is Td, the following conditions are satisfied:

$0.6 < SD62/EPD < 1.1;$ $0.80 < f1/f3;$ and $Td/EPD < 1.95.$

According to another aspect of the present disclosure, an optical imaging system includes, in order from an object side to an image side, a first lens element, a second lens element, a third lens element, a fourth lens element, a fifth lens element, and a sixth lens element. The first lens element with positive refractive power has an object-side surface being convex in a paraxial region thereof, and the first lens element is made of plastic material. The second lens element has refractive power. The third lens element has positive refractive power. The fourth lens element has refractive power. The fifth lens element with refractive power has an image-side surface being concave in a paraxial region thereof, wherein both of an object-side surface and the image-side surface of the fifth lens element are aspheric. The sixth lens element with refractive power has an image-side surface being concave in a paraxial region thereof, wherein the image-side surface of the sixth lens element has at least one convex shape in an off-axis region thereof, and both of an object-side surface and the image-side surface of the sixth lens element are aspheric. The optical imaging system has a total of six lens elements with refractive power. The first lens element, the second lens element, the third lens element, the fourth lens element, the fifth lens element and the sixth lens element are all stationary relative to one another in a paraxial region thereof. An air gap in a paraxial region is between every two of the first lens element, the second lens element, the third lens element, the fourth lens element, the fifth lens element and the sixth lens element that are adjacent to each other. The optical imaging system further comprises a stop located between an imaged object and the third lens element. When a maximum effective radius of the image-side surface of the sixth lens element is SD62, an entrance pupil diameter of the optical imaging system is EPD, a focal length of the optical imaging system is f, a focal length of the first lens element is f1, a focal length of the third lens element is f3, an axial distance between the object-side surface of the first lens element and the image-side surface of the sixth lens element is Td, a curvature radius of an object-side surface of the third lens element is R5, a curvature radius of an image-side surface of the third lens element is R6, a central thickness of the first lens element is CT1, a central thickness of the second lens element is CT2, the following conditions are satisfied:

$0.6 < SD62/EPD < 1.33;$ $0.80 < f1/f3;$ $Td/EPD < 2.15;$ $-1.125 < (f/R5)+(f/R6);$ $1.45 < CT1/CT2;$ and $8.25 < EPD/CT2.$ According to still another aspect of the present disclosure, an image capturing unit includes the aforementioned optical imaging system and an image sensor, wherein the image sensor is disposed on the image side of the optical imaging system.

According to yet another aspect of the present disclosure, an electronic device includes the aforementioned image capturing unit.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
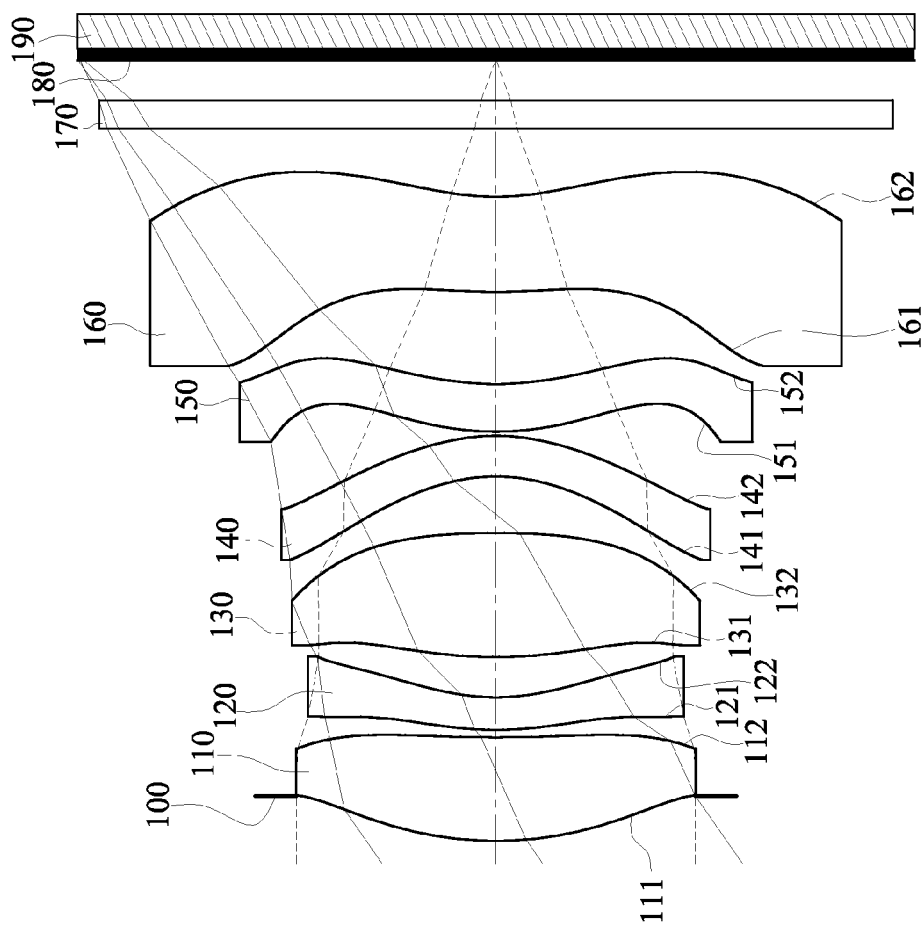
FIG. 1 is a schematic view of an image capturing unit according to the 1st embodiment of the present disclosure.

An optical imaging system includes, in order from an object side to an image side, a first lens element, a second lens element, a third lens element, a fourth lens element, a fifth lens element and a sixth lens element. The optical imaging system has a total of six lens elements with refractive power.

According to the optical imaging system of the present disclosure, an air gap in a paraxial region is arranged between every two of the first lens element, the second lens element, the third lens element, the fourth lens element, the fifth lens element and the sixth lens element that are adjacent to each other, that is, each of the first through sixth lens elements of the optical imaging system is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality of the optical imaging system. Therefore, there is an air gap in a paraxial region between every two of the first lens element, the second lens element, the third lens element, the fourth lens element, the fifth lens element and the sixth lens element that are adjacent to each other in the present disclosure for solving the problem generated by the cemented lens elements. Furthermore, the first lens element, the second lens element, the third lens element, the fourth lens element, the fifth lens element and the sixth lens element are all stationary relative to one another in a paraxial region thereof. That is, the air gap in a paraxial region between every two of the first lens element through the sixth lens element that are adjacent to each other is constant in the present disclosure.

The first lens element with positive refractive power has an object-side surface being convex in a paraxial region thereof. The first lens element can have an image-side surface being concave in a paraxial region thereof. Therefore, the first lens element provides the optical imaging system with the positive refractive power as the optical imaging system needs to be. Furthermore, it is favorable for properly reducing a total track length of the optical imaging system and avoiding excessive aberration.

The second lens element can have negative refractive power. Therefore, it is favorable for correcting the aberration from the first lens element so as to improve the image quality.

The third lens element has positive refractive power. Therefore, the first lens element and the third lens element are favorable for balancing the arrangement of the refractive power of the optical imaging system so as to reduce the sensitivity of the optical imaging system.

The fourth lens element can have negative refractive power. The fourth lens element can have an image-side surface being convex in a paraxial region thereof. Therefore, it is favorable for effectively correcting the Petzval sum of the optical imaging system so as to improve the flatness of the image surface and effectively correct the astigmatism.

The fifth lens element can have positive refractive power. The fifth lens element has an image-side surface being concave in a paraxial region thereof. Therefore, it is favorable for avoiding overloading the refractive power on the fifth lens element. Furthermore, it is favorable for preventing the surfaces of the fifth lens element from being excessively curved so as to reduce molding problems.

The sixth lens element with refractive power has an image-side surface being concave in a paraxial region thereof. The image-side surface of the sixth lens element has at least one convex shape in an off-axis region thereof. Therefore, it is favorable for the principal point of the optical imaging system being positioned towards the image side of the optical imaging system so as to reduce the total track length of the optical imaging system, thereby keeping a compact size thereof. Furthermore, it is favorable for correcting the aberration of the off-axis field so as to improve the image quality at the peripheral region.

Figure 17:
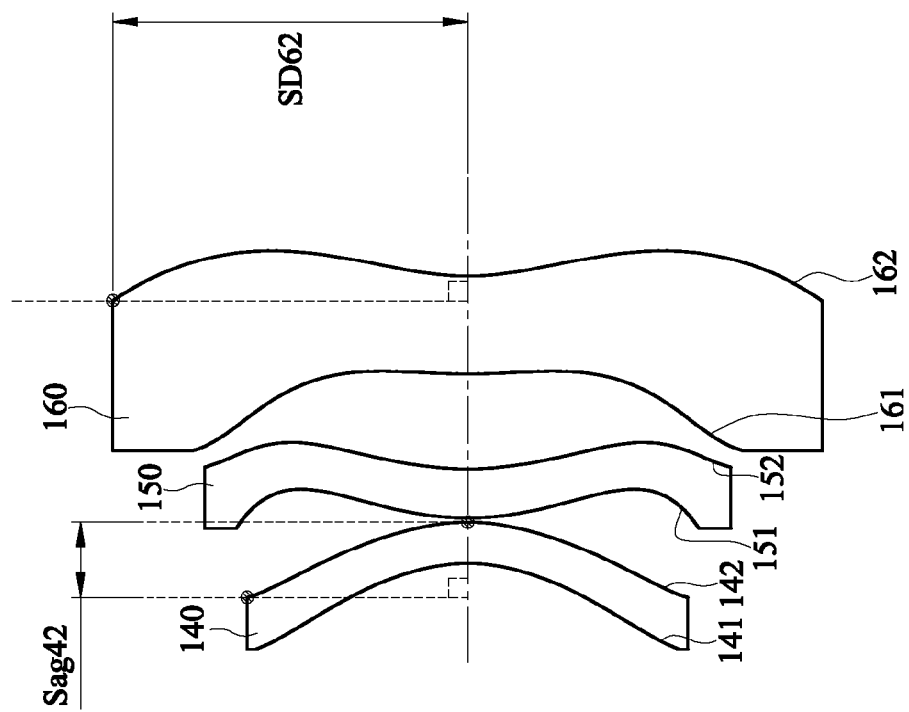
FIG. 17 is a schematic view of Sag42 of a fourth lens element and SD62 of a sixth lens element in FIG. 1.

When a maximum effective radius of the image-side surface of the sixth lens element is SD62, an entrance pupil diameter of the optical imaging system is EPD, the following condition is satisfied: 0.6<SD62/EPD<1.33. Therefore, it is favorable for obtaining proper outer diameter of the sixth lens element and providing sufficient amount of incident light so as to keep the optical imaging system compact and satisfy the requirement for large aperture. Preferably, the following condition is satisfied: 0.6<SD62/EPD<1.1. As seen in FIG. 17, it shows a schematic view of SD62 of a sixth lens element in FIG. 1.

When a focal length of the first lens element is f1, a focal length of the third lens element is f3, the following condition is satisfied: 0.80<f1/f3. Therefore, it is favorable for balancing the arrangement of the refractive powers of the first lens element and the third lens element so as to avoid excessive aberration. Preferably, the following condition is satisfied: 0.95<f1/f3.

When an axial distance between the object-side surface of the first lens element and the image-side surface of the sixth lens element is Td, the entrance pupil diameter of the optical imaging system is EPD, the following condition is satisfied: Td/EPD<2.15. Therefore, it is favorable for increasing amount of incident light and keeping the optical imaging system compact. Preferably, the following condition is satisfied: Td/EPD<1.95.

When a focal length of the optical imaging system is f, a curvature radius of an object-side surface of the third lens element is R5, a curvature radius of an image-side surface of the third lens element is R6, the following condition is satisfied: −1.125<(f/R5)+(f/R6). Therefore, it is favorable for correcting the spherical aberration of the optical imaging system so as to improve the image quality. Preferably, the following condition is satisfied: −1.0<(f/R5)+(f/R6)<1.0.

When a central thickness of the first lens element is CT1, a central thickness of the second lens element is CT2, the following condition is satisfied: 1.45<CT1/CT2. Therefore, the thicknesses of the first lens element and the second lens element are properly distributed so that it is favorable for preventing the lens elements from unfavorable molding problems so as to increase the manufacturing yield rate.

When the entrance pupil diameter of the optical imaging system is EPD, the central thickness of the second lens element is CT2, the following condition is satisfied: 8.25<EPD/CT2. Preferably, the following condition is satisfied: 9.5<EPD/CT2. Therefore, the resulted thin lens design is favorable for effectively reducing the total track length of the optical imaging system and providing sufficient amount of incident light.

When a refractive index of the first lens element is N1, the following condition is satisfied: 1.40<N1<1.65. Therefore, it is favorable for choosing the proper material of the first lens element.

When an f-number of the optical imaging system is Fno, the following condition is satisfied: Fno<1.75. Therefore, it is favorable for obtaining a large aperture for receiving sufficient incoming light, thereby increasing the image quality while the optical imaging system is in a low light condition with a shutter at a high speed. Preferably, the following condition is satisfied: Fno<1.55.

When the central thickness of the second lens element is CT2, a central thickness of the third lens element is CT3, a central thickness of the fourth lens element is CT4, the following condition is satisfied: 1.0<CT3/(CT2+CT4). Therefore, it is favorable for preventing the lens elements from unfavorable molding problems so as to increase the manufacturing yield rate. Furthermore, the thicknesses of the lens elements are properly distributed so that it is favorable for keeping the optical imaging system compact.

When the focal length of the first lens element is f1, a focal length of the second lens element is f2, the following condition is satisfied: −1.0<f1/f2. Preferably, the following condition is satisfied: −1.0<f1/f2<0. Therefore, it is favorable for balancing the arrangement of the refractive power of the optical imaging system so as to improve the aberration correction capability.

When the curvature radius of the object-side surface of the third lens element is R5, the curvature radius of the image-side surface of the third lens element is R6, the following condition is satisfied: (R5+R6)/(R5−R6)<0.50. Therefore, it is favorable for improving the spherical aberration correction capability of the optical imaging system.

When the focal length of the optical imaging system is f, a curvature radius of the image-side surface of the fifth lens element is R10, the following condition is satisfied: 0.55<f/R10<3.0. Therefore, it is favorable for avoiding overloading the refractive power on the fifth lens element and preventing the fifth lens element from excessively curved due to overly large curvature at the peripheral region so as to reduce the molding problems.

When an axial distance between the first lens element and the second lens element is T12, an axial distance between the second lens element and the third lens element is T23, the following condition is satisfied: 0<T12/T23<0.50. Therefore, it is favorable for reducing the total track length of the optical imaging system so as to keep in a compact size thereof.

When the central thickness of the first lens element is CT1, the central thickness of the third lens element is CT3, the following condition is satisfied: 1.16<CT3/CT1. Therefore, the thicknesses of the lens elements are more proper for preventing the lens elements from unfavorable molding problems and keeping the optical imaging system compact.

When a distance in parallel with an optical axis from an intersection point of the image-side surface of the fourth lens element and the optical axis to a position of a maximum effective radius of the image-side surface of the fourth lens element is Sag42, the central thickness of the fourth lens element is CT4, and the following condition is satisfied: 1.40<|Sag42|/CT4. Therefore, it is favorable for obtaining proper shape and thickness of the image-side surface of fourth lens element so as to correct the aberration of the optical imaging system at the peripheral region. Furthermore, it is favorable for assembling the lens elements so as to increase the manufacturing yield rate. As seen in FIG. 17, it shows a schematic view of Sag42 of a fourth lens element in FIG. 1.

When an Abbe number of the fourth lens element is V4, the following condition is satisfied: V4<30. Therefore, it is favorable for correcting the chromatic aberration of the optical imaging system.

According to the optical imaging system of the present disclosure, an aperture stop can be configured as a front stop or a middle stop. A front stop disposed between an imaged object and the first lens element can provide a longer distance between an exit pupil of the optical imaging system and the image surface and thereby improves the image-sensing efficiency of an image sensor (for example, CCD or CMOS). A middle stop disposed between the first lens element and the image surface is favorable for enlarging the field of view of the optical imaging system and thereby provides a wider field of view for the same.

According to the optical imaging system of the present disclosure, the lens elements thereof can be made of glass or plastic material. When the lens elements are made of glass material, the distribution of the refractive power of the optical imaging system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the optical imaging system can also be reduced.

According to the optical imaging system of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the optical imaging system of the present disclosure, an image surface of the optical imaging system, based on the corresponding image sensor, can be flat or curved, especially a curved surface being concave facing towards the object side of the optical imaging system.

According to the optical imaging system of the present disclosure, the optical imaging system can include at least one stop, such as an aperture stop, a glare stop or a field stop. Said glare stop or said field stop is set for eliminating the stray light and thereby improving the image quality thereof.

According to the present disclosure, an image capturing unit is provided. The image capturing unit includes the optical imaging system according to the aforementioned optical imaging system of the present disclosure, and an image sensor, wherein the image sensor is disposed on the image side of the aforementioned optical imaging system, that is, the image sensor can be disposed on or near an image surface of the aforementioned optical imaging system. In some embodiments, the image capturing unit can further include a barrel member, a holding member or a combination thereof.

Figure 19:
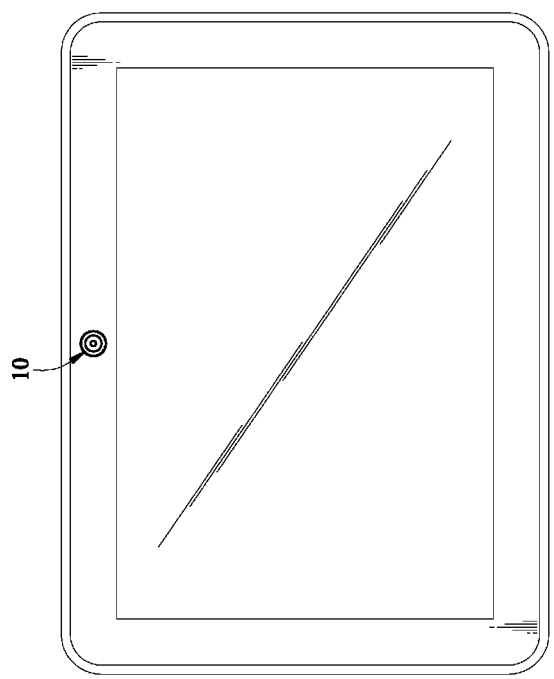
FIG. 19 shows an electronic device according to another embodiment.
Figure 18:
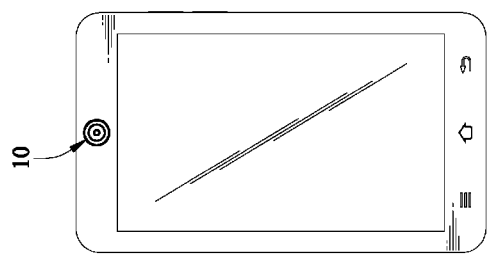
FIG. 18 shows an electronic device according to one embodiment.
Figure 20:
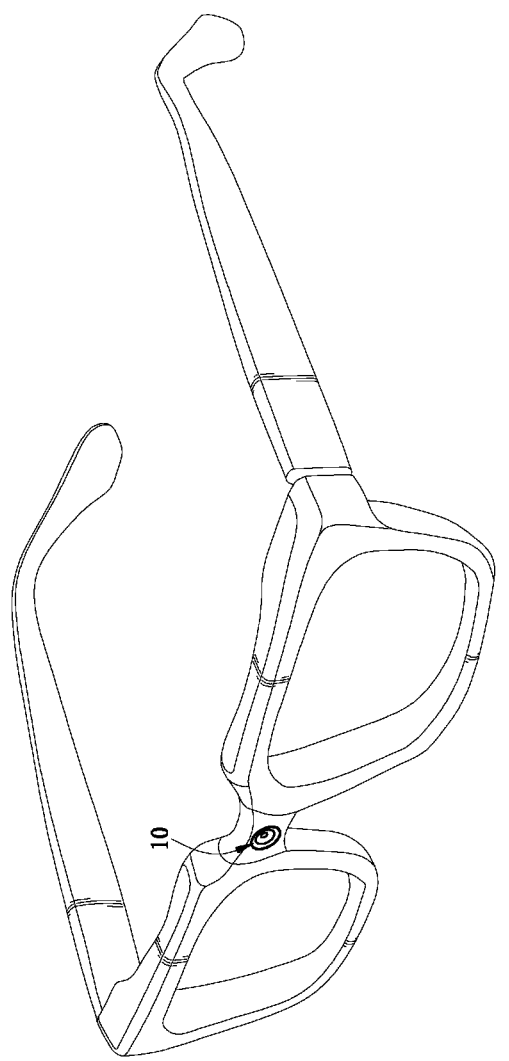
FIG. 20 shows an electronic device according to still another embodiment.

In FIG. 18, FIG. 19 and FIG. 20, an image capturing device 10 may be installed in, but not limited to, an electronic device, including a smart phone (FIG. 18), a tablet personal computer (FIG. 19) or a wearable device (FIG. 20). The three figures of different kinds of electronic device are only exemplary for showing the image capturing device of present disclosure installing in an electronic device and is not limited thereto. In some embodiments, the electronic device can further include, but not limited to, a display unit, a control unit, a storage unit, a random access memory unit (RAM), a read only memory unit (ROM) or a combination thereof.

According to the optical imaging system of the present disclosure, the optical imaging system is featured with good capability in the correction of aberration and high image quality, and can be applied to 3D (three-dimensional) image capturing applications, in products such as digital cameras, mobile devices, digital tablets, wearable devices, smart televisions, wireless monitoring devices, motion sensing input devices, driving recorders, rear view cameras and other electronic imaging devices. According to the above description of the present disclosure, the following specific embodiments are provided for further explanation.

1st Embodiment

Figure 2:
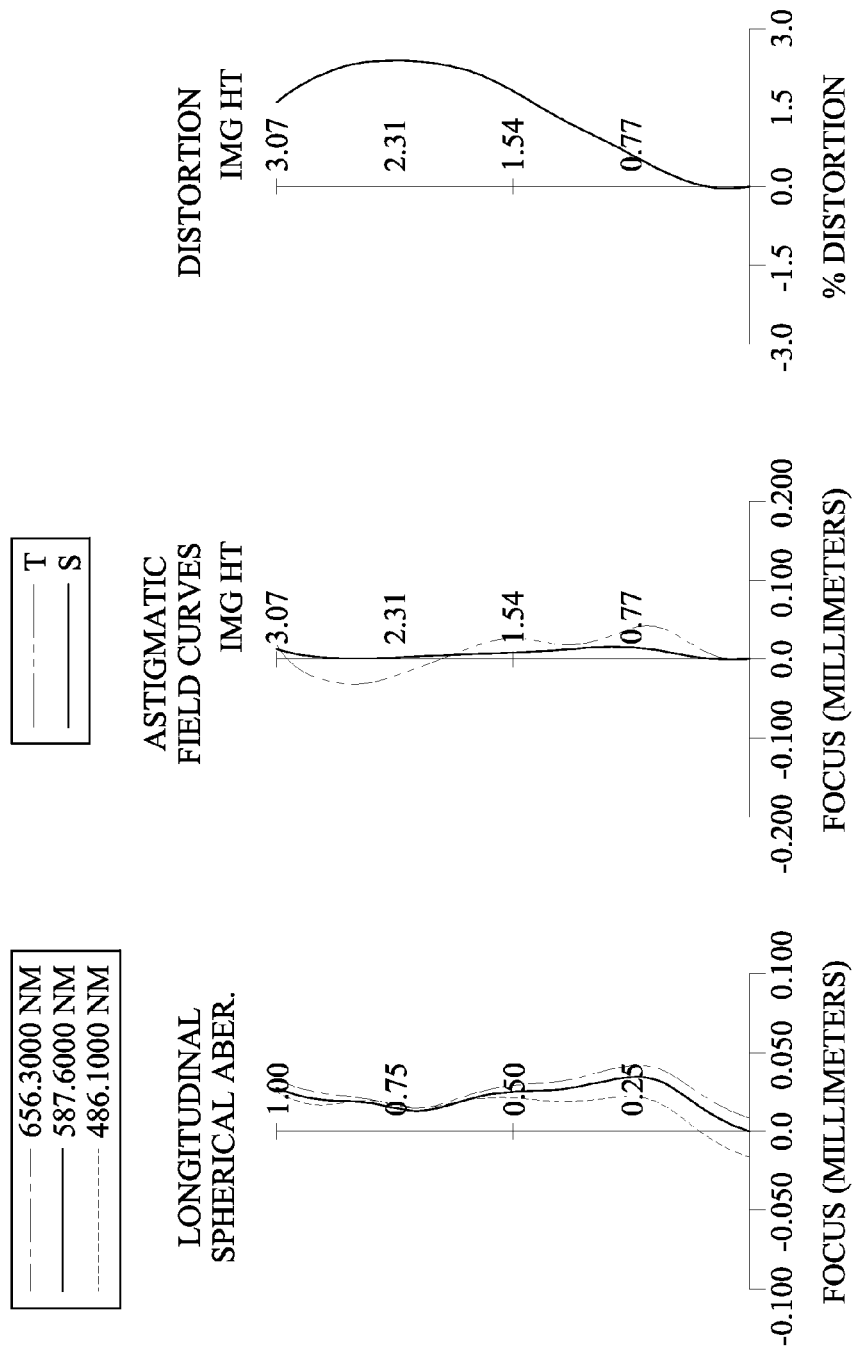
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging system (its reference numeral is omitted) of the present disclosure and an image sensor 190. The optical imaging system includes, in order from an object side to an image side, an aperture stop 100, a first lens element 110, a second lens element 120, a third lens element 130, a fourth lens element 140, a fifth lens element 150, a sixth lens element 160, an IR-cut filter 170 and an image surface 180, wherein the optical imaging system has a total of six non-cemented lens elements (110-160) with refractive power. There is an air gap in a paraxial region between every two of the first lens element 110, the second lens element 120, the third lens element 130, the fourth lens element 140, the fifth lens element 150 and the sixth lens element 160 that are adjacent to each other. The first lens element 110, the second lens element 120, the third lens element 130, the fourth lens element 140, the fifth lens element 150 and the sixth lens element 160 are all stationary relative to one another in a paraxial region thereof.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The image-side surface 162 of the sixth lens element 160 has at least one convex shape in an off-axis region thereof.

The IR-cut filter 170 is made of glass and located between the sixth lens element 160 and the image surface 180, and will not affect the focal length of the optical imaging system. The image sensor 190 is disposed on or near the image surface 180 of the optical imaging system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i}(Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical imaging system of the image capturing unit according to the 1st embodiment, when a focal length of the optical imaging system is f, an f-number of the optical imaging system is Fno, and half of a maximal field of view of the optical imaging system is HFOV, these parameters have the following values: f=4.32 millimeters (mm); Fno=1.47; and HFOV=34.9 degrees (deg.).

When an axial distance between the object-side surface 111 of the first lens element 110 and the image-side surface 162 of the sixth lens element 160 is Td, an entrance pupil diameter of the optical imaging system is EPD, the following condition is satisfied: Td/EPD=1.61.

When a refractive index of the first lens element 110 is N1, the following condition is satisfied: N1=1.544.

When an Abbe number of the fourth lens element 140 is V4, the following condition is satisfied: V4=23.3.

When a central thickness of the first lens element 110 is CT1, a central thickness of the second lens element 120 is CT2, the following condition is satisfied: CT1/CT2=3.18.

When the central thickness of the first lens element 110 is CT1, a central thickness of the third lens element 130 is CT3, the following condition is satisfied: CT3/CT1=1.20.

When the central thickness of the second lens element 120 is CT2, the central thickness of the third lens element 130 is CT3, a central of the fourth lens element 140 is CT4, the following condition is satisfied: CT3/(CT2+CT4)=1.69.

When an axial distance between the first lens element 110 and the second lens element 120 is T12, an axial distance between the second lens element 120 and the third lens element 130 is T23, the following condition is satisfied: T12/T23=0.18.

When a distance in parallel with an optical axis from an intersection point of the image-side surface 142 of the fourth lens element 140 and the optical axis to a position of a maximum effective radius of the image-side surface 142 of the fourth lens element 140 is Sag42, the central thickness of the fourth lens element 140 is CT4, and the following condition is satisfied: |Sag42|/CT4=1.81.

When the entrance pupil diameter of the optical imaging system is EPD, the central thickness of the second lens element 120 is CT2, the following condition is satisfied: EPD/CT2=12.24.

When a maximum effective radius of the image-side surface 162 of the sixth lens element 160 is SD62, the entrance pupil diameter of the optical imaging system is EPD, the following condition is satisfied: SD62/EPD=0.86.

When a curvature radius of the object-side surface 131 of the third lens element 130 is R5, a curvature radius of the image-side surface 132 of the third lens element 130 is R6, the following condition is satisfied: (R5+R6)/(R5−R6)=−0.25.

When the focal length of the optical imaging system is f, the curvature radius of the object-side surface 131 of the third lens element 130 is R5, the curvature radius of the image-side surface 132 of the third lens element 130 is R6, the following condition is satisfied: (f/R5)+(f/R6)=0.51.

When the focal length of the optical imaging system is f, a curvature radius of the image-side surface 152 of the fifth lens element 150 is R10, the following condition is satisfied: f/R10=2.17.

When a focal length of the first lens element 110 is f1, a focal length of the second lens element 120 is f2, the following condition is satisfied: f1/f2=−0.80.

When the focal length of the first lens element 110 is f1, a focal length of the third lens element 130 is f3, the following condition is satisfied: f1/f3=1.47.

The detailed optical data of the 1st embodiment are shown in Table 1 and the aspheric surface data are shown in Table 2 below.

TABLE 1

1st Embodiment
f = 4.32 mm, Fno = 1.47, HFOV = 34.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.329 | | | | |
| 2 | Lens 1 | 2.663 | (ASP) | 0.763 | Plastic | 1.544 | 55.9 | 6.00 |
| 3 | | 13.004 | (ASP) | 0.054 | | | | |
| 4 | Lens 2 | 2.485 | (ASP) | 0.240 | Plastic | 1.639 | 23.5 | −7.47 |
| 5 | | 1.572 | (ASP) | 0.297 | | | | |
| 6 | Lens 3 | 3.425 | (ASP) | 0.914 | Plastic | 1.544 | 55.9 | 4.09 |
| 7 | | −5.759 | (ASP) | 0.416 | | | | |
| 8 | Lens 4 | −1.265 | (ASP) | 0.300 | Plastic | 1.640 | 23.3 | 108.03 |
| 9 | | −1.357 | (ASP) | 0.030 | | | | |
| 10 | Lens 5 | 2.167 | (ASP) | 0.350 | Plastic | 1.544 | 55.9 | −144.00 |
| 11 | | 1.989 | (ASP) | 0.679 | | | | |
| 12 | Lens 6 | 4.272 | (ASP) | 0.701 | Plastic | 1.530 | 55.8 | −7.21 |
| 13 | | 1.902 | (ASP) | 0.500 | | | | |
| 14 | IR-cut filter | Plano | | 0.210 | Glass | 1.517 | 64.2 | — |
| 15 | | Plano | | 0.296 | | | | |
| 16 | Image | Plano | | — | | | | |

Note:
Reference wavelength is 587.6 nm (d-line).
Effective radius of Surface 5 is 1.315 mm.

TABLE 2

Aspheric Coefficients

| Surface # | 2 | 3 | 4 | 5 | 6 | 7 |
|---|---|---|---|---|---|---|
| k = | 5.3043E−01 | 3.3740E+01 | −3.1105E+01 | −1.0749E+01 | −5.9046E+01 | −9.0000E+01 |
| A4 = | 3.6435E−03 | 2.9326E−02 | 1.2237E−01 | 1.4643E−01 | 1.2056E−01 | −1.1771E−01 |
| A6 = | −2.6426E−02 | −1.1488E−01 | −3.5292E−01 | −3.3831E−01 | −2.1079E−01 | 9.3098E−02 |
| A8 = | 2.6850E−02 | 8.6147E−02 | 3.3899E−01 | 3.4396E−01 | 1.9913E−01 | −1.1988E−01 |
| A10 = | −2.0212E−02 | −3.6068E−02 | −1.7470E−01 | −2.0029E−01 | −1.3447E−01 | 9.6025E−02 |
| A12 = | 6.6982E−03 | 8.5785E−03 | 5.1405E−02 | 6.5817E−02 | 4.8501E−02 | −4.6560E−02 |
| A14 = | −9.0366E−04 | −9.7086E−04 | −6.8829E−03 | −9.0148E−03 | −6.5029E−03 | 1.2717E−02 |
| A16 = | — | — | — | — | — | −1.5139E−03 |

| Surface # | 8 | 9 | 10 | 11 | 12 | 13 |
|---|---|---|---|---|---|---|
| k = | −1.0061E+00 | −1.1199E+01 | −1.8324E+00 | −3.7048E+01 | 1.9061E+00 | −9.0134E−01 |
| A4 = | 1.5845E−01 | −1.0562E−01 | 2.5449E−02 | 1.4206E−01 | −1.9411E−01 | −1.6722E−01 |
| A6 = | −2.1896E−01 | 3.4777E−02 | −1.1503E−01 | −1.6189E−01 | 7.1038E−02 | 7.3886E−02 |
| A8 = | 1.9455E−01 | 6.4581E−03 | 8.1751E−02 | 8.4626E−02 | −1.8820E−02 | −2.6389E−02 |
| A10 = | −8.9587E−02 | −7.7653E−04 | −3.9256E−02 | −3.0721E−02 | −8.0841E−04 | 6.1865E−03 |
| A12 = | 2.0693E−02 | −3.0383E−03 | 9.6513E−03 | 6.5012E−03 | 1.8479E−03 | −8.7618E−04 |
| A14 = | −1.8289E−03 | 8.4999E−04 | −9.4818E−04 | −5.5321E−04 | −3.3802E−04 | 6.7581E−05 |
| A16 = | — | — | — | — | 1.5772E−05 | −2.1730E−06 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
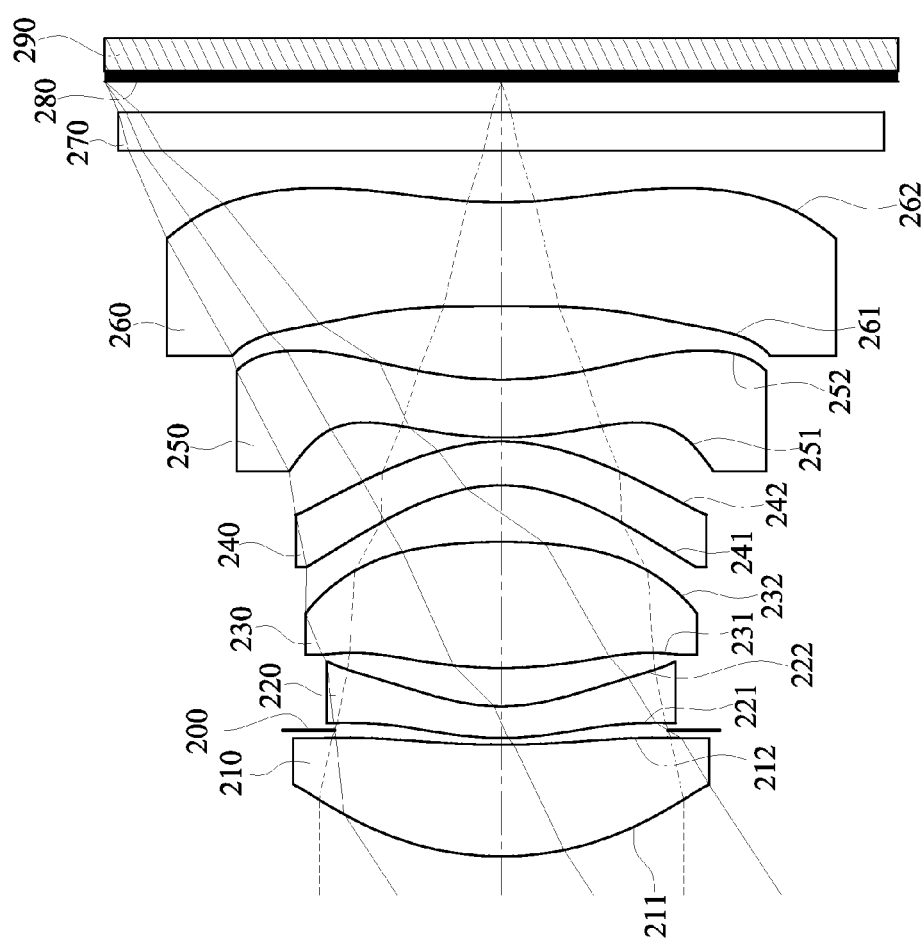
FIG. 3 is a schematic view of an image capturing unit according to the 2nd embodiment of the present disclosure.
Figure 4:
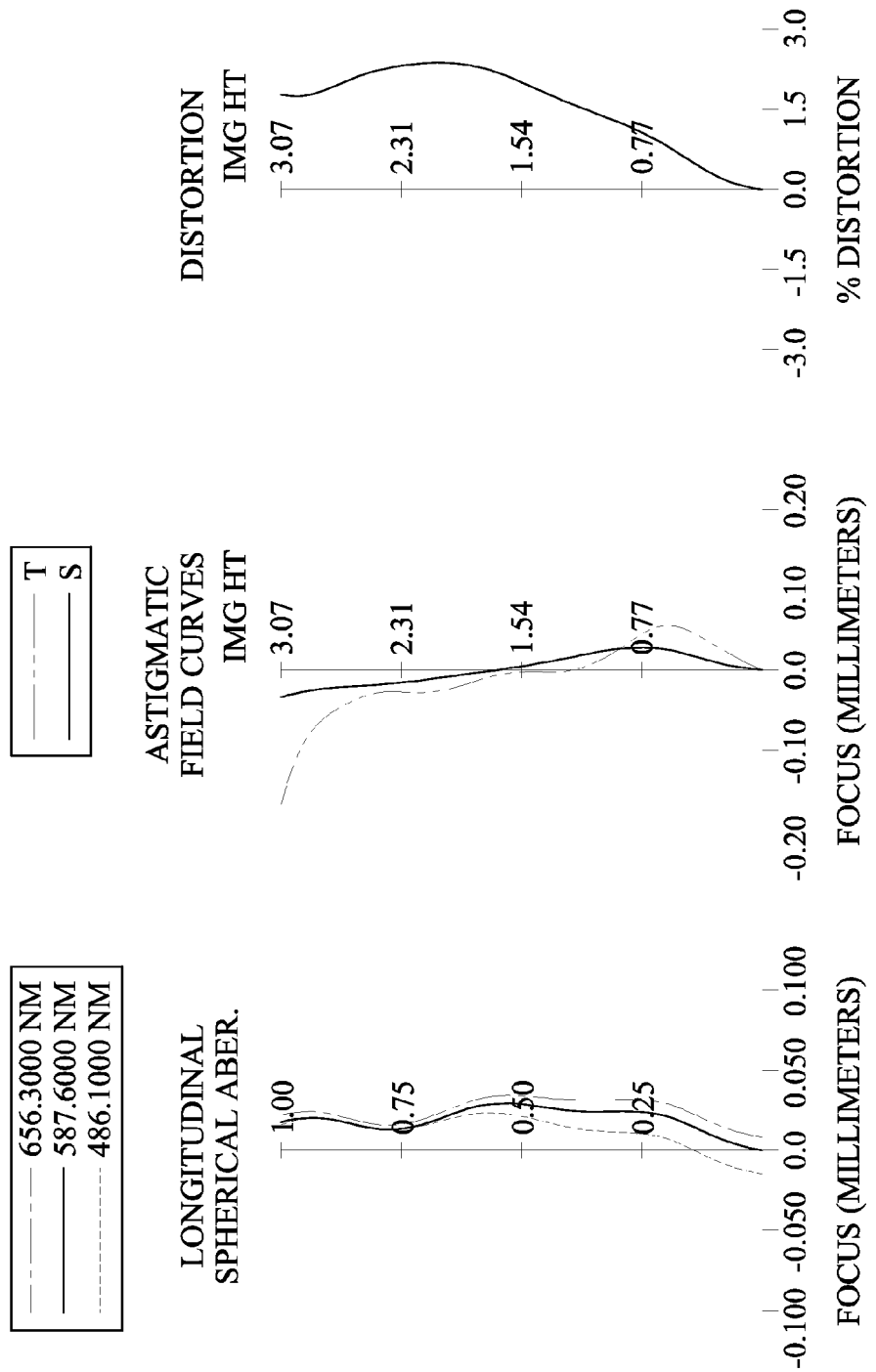
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging system (its reference numeral is omitted) of the present disclosure and an image sensor 290. The optical imaging system includes, in order from an object side to an image side, a first lens element 210, an aperture stop 200, a second lens element 220, a third lens element 230, a fourth lens element 240, a fifth lens element 250, a sixth lens element 260, an IR-cut filter 270 and an image surface 280, wherein the optical imaging system has a total of six non-cemented lens elements (210-260) with refractive power. There is an air gap in a paraxial region between every two of the first lens element 210, the second lens element 220, the third lens element 230, the fourth lens element 240, the fifth lens element 250 and the sixth lens element 260 that are adjacent to each other. The first lens element 210, the second lens element 220, the third lens element 230, the fourth lens element 240, the fifth lens element 250 and the sixth lens element 260 are all stationary relative to one another in a paraxial region thereof.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric.

The sixth lens element 260 with negative refractive power has an object-side surface 261 being concave in a paraxial region thereof and an image-side surface 262 being concave in a paraxial region thereof. The sixth lens element 260 is made of plastic material and has the object-side surface 261 and the image-side surface 262 being both aspheric. The image-side surface 262 of the sixth lens element 260 has at least one convex shape in an off-axis region thereof.

The IR-cut filter 270 is made of glass and located between the sixth lens element 260 and the image surface 280, and will not affect the focal length of the optical imaging system. The image sensor 290 is disposed on or near the image surface 280 of the optical imaging system.

The detailed optical data of the 2nd embodiment are shown in Table 3 and the aspheric surface data are shown in Table 4 below.

TABLE 3

2nd Embodiment
f = 4.57 mm, Fno = 1.62, HFOV = 33.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.436 (ASP) | 0.867 | Plastic | 1.544 | 55.9 | 5.89 |
| 2 | | 8.894 (ASP) | 0.111 | | | | |
| 3 | Ape. Stop | Plano | −0.061 | | | | |
| 4 | Lens 2 | 2.405 (ASP) | 0.246 | Plastic | 1.639 | 23.5 | −7.37 |
| 5 | | 1.528 (ASP) | 0.298 | | | | |
| 6 | Lens 3 | 3.470 (ASP) | 0.977 | Plastic | 1.544 | 55.9 | 3.77 |
| 7 | | −4.513 (ASP) | 0.439 | | | | |
| 8 | Lens 4 | −1.266 (ASP) | 0.340 | Plastic | 1.639 | 23.5 | −210.84 |
| 9 | | −1.412 (ASP) | 0.030 | | | | |
| 10 | Lens 5 | 2.878 (ASP) | 0.449 | Plastic | 1.544 | 55.9 | −100.70 |
| 11 | | 2.584 (ASP) | 0.568 | | | | |
| 12 | Lens 6 | −94.848 (ASP) | 0.806 | Plastic | 1.544 | 55.9 | −6.05 |
| 13 | | 3.421 (ASP) | 0.400 | | | | |
| 14 | IR-cut filter | Plano | 0.300 | Glass | 1.517 | 64.2 | — |
| 15 | | Plano | 0.235 | | | | |
| 16 | Image | Plano | — | | | | |

Note:
Reference wavelength is 587.6 nm (d-line).

TABLE 4

Aspheric Coefficients

| Surface # | 1 | 2 | 4 | 5 | 6 | 7 |
|---|---|---|---|---|---|---|
| k = | 7.6484E−01 | 2.9658E+01 | −2.4704E+01 | −8.5801E+00 | −5.2329E+01 | −7.4875E+01 |
| A4 = | 5.6894E−03 | 3.9496E−02 | 1.2844E−01 | 1.4781E−01 | 1.2804E−01 | −1.2271E−01 |
| A6 = | −2.6939E−02 | −1.1252E−01 | −3.5147E−01 | −3.3751E−01 | −2.1605E−01 | 9.5305E−02 |
| A8 = | 2.8772E−02 | 8.6642E−02 | 3.3822E−01 | 3.4616E−01 | 2.0304E−01 | −1.2029E−01 |
| A10 = | −1.9781E−02 | −3.6385E−02 | −1.7584E−01 | −2.0178E−01 | −1.3564E−01 | 9.5949E−02 |
| A12 = | 6.5740E−03 | 8.3999E−03 | 5.1405E−02 | 6.5817E−02 | 4.8501E−02 | −4.6560E−02 |
| A14 = | −9.0366E−04 | −9.7086E−04 | −6.8829E−03 | −9.0148E−03 | −6.5029E−03 | 1.2717E−02 |
| A16 = | — | — | — | — | — | −1.5192E−03 |

TABLE 4-continued

| | Aspheric Coefficients | | | | | |
|---|---|---|---|---|---|---|
| Surface # | 8 | 9 | 10 | 11 | 12 | 13 |
| k = | −1.0402E+00 | −9.2152E+00 | −2.6554E+00 | −3.7048E+01 | −9.0000E+01 | −5.3282E−02 |
| A4 = | 1.6034E−01 | −9.4291E−02 | 1.1328E−03 | 9.7336E−02 | −9.0959E−02 | −8.2904E−02 |
| A6 = | −2.2014E−01 | 3.4310E−02 | −1.0129E−01 | −9.5679E−02 | 6.5105E−02 | 3.1201E−02 |
| A8 = | 1.9561E−01 | 5.2099E−03 | 7.9615E−02 | 4.4899E−02 | −4.0714E−02 | −1.0878E−02 |
| A10 = | −9.0543E−02 | −8.8832E−04 | −3.9440E−02 | −1.3023E−02 | 2.1249E−02 | 2.5068E−03 |
| A12 = | 2.0693E−02 | −3.0383E−03 | 8.7214E−03 | 2.1339E−03 | −6.7756E−03 | −3.4946E−04 |
| A14 = | −1.8289E−03 | 8.4999E−04 | −6.1908E−04 | −1.5192E−04 | 1.1117E−03 | 2.5955E−05 |
| A16 = | — | — | — | — | −7.3151E−05 | −7.7650E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 4.57 | T12/T23 | 0.17 |
| Fno | 1.62 | |Sag42|/CT4 | 1.67 |
| HFOV [deg.] | 33.3 | EPD/CT2 | 11.47 |
| Td/EPD | 1.80 | SD62/EPD | 0.92 |
| N1 | 1.544 | (R5 + R6)/(R5 − R6) | −0.13 |
| V4 | 23.5 | (f/R5) + (f/R6) | 0.30 |
| CT1/CT2 | 3.52 | f/R10 | 1.77 |
| CT3/CT1 | 1.13 | f1/f2 | −0.80 |
| CT3/(CT2 + CT4) | 1.67 | f1/f3 | 1.56 |

3rd Embodiment

Figure 5:
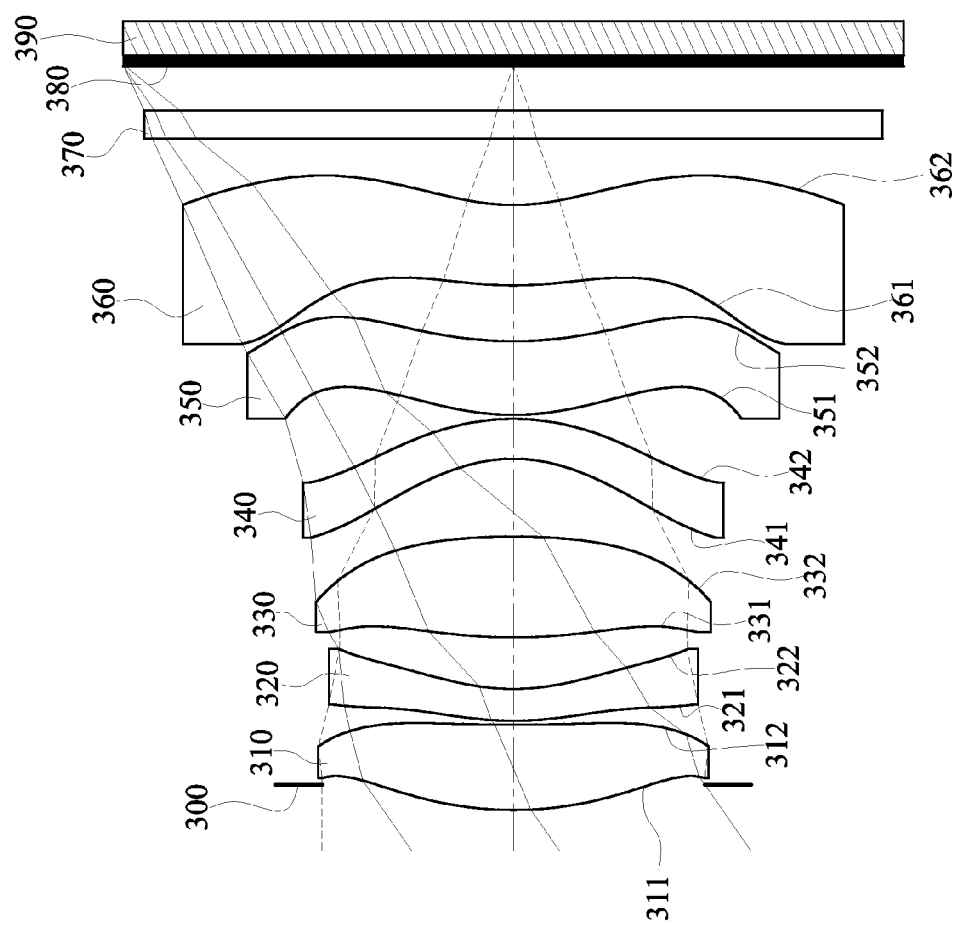
FIG. 5 is a schematic view of an image capturing unit according to the 3rd embodiment of the present disclosure.
Figure 6:
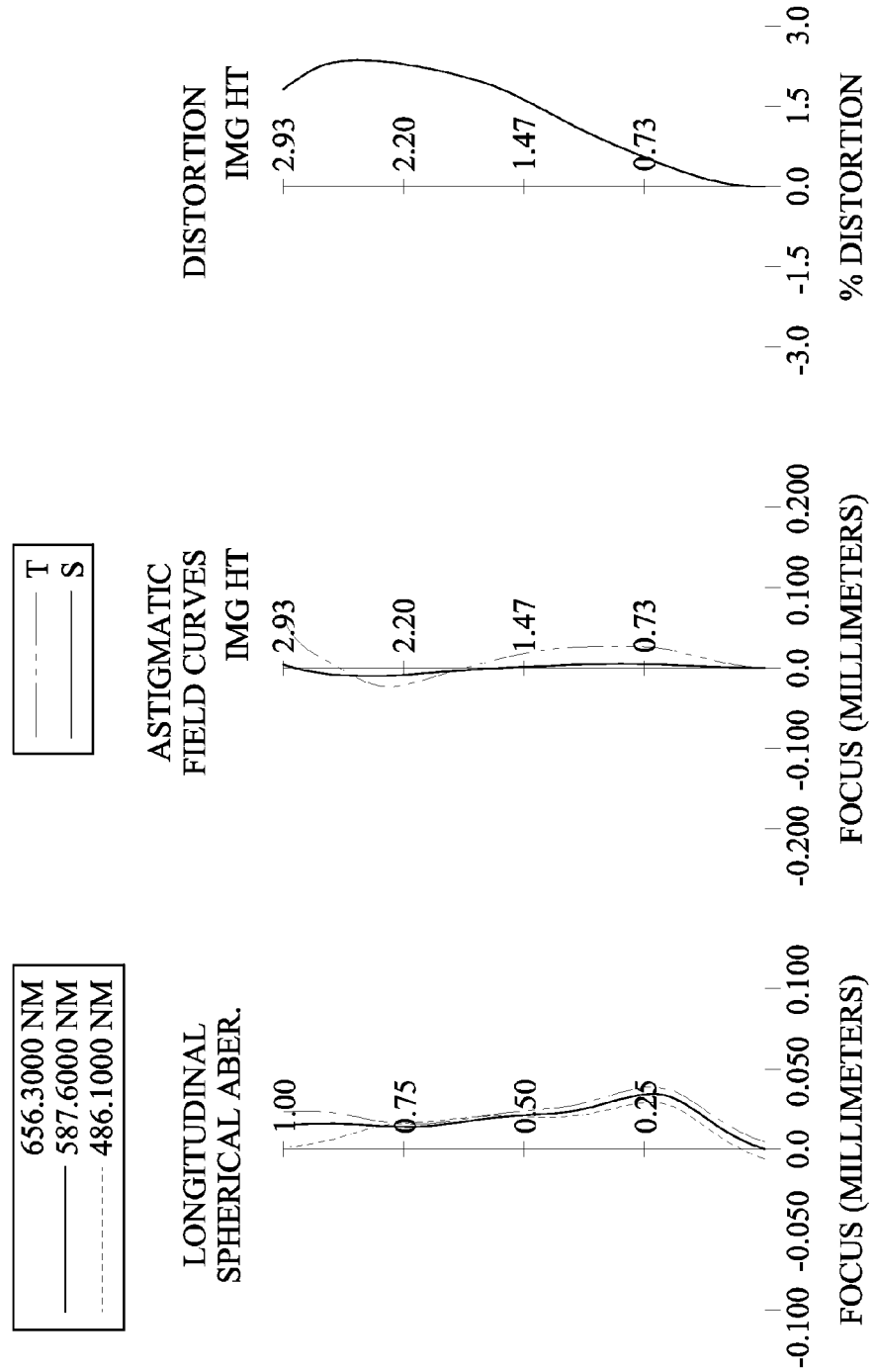
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging system (its reference numeral is omitted) of the present disclosure and an image sensor 390. The optical imaging system includes, in order from an object side to an image side, an aperture stop 300, a first lens element 310, a second lens element 320, a third lens element 330, a fourth lens element 340, a fifth lens element 350, a sixth lens element 360, an IR-cut filter 370 and an image surface 380, wherein the optical imaging system has a total of six non-cemented lens elements (310-360) with refractive power. There is an air gap in a paraxial region between every two of the first lens element 310, the second lens element 320, the third lens element 330, the fourth lens element 340, the fifth lens element 350 and the sixth lens element 360 that are adjacent to each other. The first lens element 310, the second lens element 320, the third lens element 330, the fourth lens element 340, the fifth lens element 350 and the sixth lens element 360 are all stationary relative to one another in a paraxial region thereof.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with negative refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with positive refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The image-side surface 362 of the sixth lens element 360 has at least one convex shape in an off-axis region thereof.

The IR-cut filter 370 is made of glass and located between the sixth lens element 360 and the image surface 380, and will not affect the focal length of the optical imaging system. The image sensor 390 is disposed on or near the image surface 380 of the optical imaging system.

The detailed optical data of the 3rd embodiment are shown in Table 5 and the aspheric surface data are shown in Table 6 below.

TABLE 5

3rd Embodiment
f = 4.12 mm, Fno = 1.43, HFOV = 34.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.191 | | | | |
| 2 | Lens 1 | 2.682 (ASP) | 0.642 | Plastic | 1.544 | 55.9 | 6.06 |
| 3 | | 13.145 (ASP) | 0.030 | | | | |
| 4 | Lens 2 | 2.479 (ASP) | 0.240 | Plastic | 1.639 | 23.5 | −9.02 |
| 5 | | 1.668 (ASP) | 0.387 | | | | |
| 6 | Lens 3 | 3.903 (ASP) | 0.760 | Plastic | 1.544 | 55.9 | 4.14 |
| 7 | | −4.959 (ASP) | 0.586 | | | | |
| 8 | Lens 4 | −1.138 (ASP) | 0.300 | Plastic | 1.639 | 23.5 | −7.06 |
| 9 | | −1.678 (ASP) | 0.030 | | | | |
| 10 | Lens 5 | 1.982 (ASP) | 0.555 | Plastic | 1.544 | 55.9 | 8.80 |
| 11 | | 3.049 (ASP) | 0.418 | | | | |
| 12 | Lens 6 | 2.536 (ASP) | 0.607 | Plastic | 1.535 | 55.7 | −10.34 |
| 13 | | 1.593 (ASP) | 0.500 | | | | |
| 14 | IR-cut filter | Plano | 0.210 | Glass | 1.517 | 64.2 | — |
| 15 | | Plano | 0.334 | | | | |
| 16 | Image | Plano | — | | | | |

Note:
Reference wavelength is 587.6 nm (d-line).
Effective radius of Surface 5 is 1.315 mm.

TABLE 6

Aspheric Coefficients

| Surface # | 2 | 3 | 4 | 5 | 6 | 7 |
|---|---|---|---|---|---|---|
| k = | 5.7256E−01 | −6.8551E+01 | −3.0998E+01 | −1.2308E+01 | −8.5234E+01 | −6.4582E+01 |
| A4 = | 7.9050E−04 | 2.2402E−02 | 1.1899E−01 | 1.4854E−01 | 1.1557E−01 | −1.0701E−01 |
| A6 = | −2.5117E−02 | −1.1486E−01 | −3.4920E−01 | −3.3582E−01 | −2.1149E−01 | 9.1859E−02 |
| A8 = | 2.2228E−02 | 8.6564E−02 | 3.4100E−01 | 3.4738E−01 | 2.0018E−01 | −1.2241E−01 |
| A10 = | −2.0287E−02 | −3.6662E−02 | −1.7528E−01 | −2.0219E−01 | −1.3509E−01 | 9.6575E−02 |
| A12 = | 6.6982E−03 | 8.5785E−03 | 5.1405E−02 | 6.5817E−02 | 4.8501E−02 | −4.6560E−02 |
| A14 = | −9.0366E−04 | −9.7086E−04 | −6.8829E−03 | −9.0148E−03 | −6.5029E−03 | 1.2717E−02 |
| A16 = | — | — | — | — | — | −1.5139E−03 |

| Surface # | 8 | 9 | 10 | 11 | 12 | 13 |
|---|---|---|---|---|---|---|
| k = | −1.1157E+00 | −8.3533E+00 | −2.3683E+00 | −3.7048E+01 | −9.1100E−01 | −7.4687E−01 |
| A4 = | 1.6599E−01 | −1.1481E−01 | −4.4703E−02 | 1.3805E−01 | −2.0531E−01 | −2.0796E−01 |
| A6 = | −2.1342E−01 | 4.4825E−02 | −1.3182E−02 | −1.5317E−01 | 8.5004E−02 | 9.4618E−02 |
| A8 = | 1.9667E−01 | 8.2097E−03 | 3.2982E−03 | 7.7835E−02 | −2.9409E−02 | −3.6829E−02 |
| A10 = | −9.0947E−02 | −1.6638E−03 | 1.0917E−03 | −2.5272E−02 | 2.4930E−03 | 9.4127E−03 |
| A12 = | 2.0693E−02 | −3.0383E−03 | −1.1190E−03 | 4.5040E−03 | 1.5835E−03 | −1.4235E−03 |
| A14 = | −1.8289E−03 | 8.4999E−04 | 1.6855E−04 | −3.2067E−04 | −4.1257E−04 | 1.1434E−04 |
| A16 = | — | — | — | — | 2.8465E−05 | −3.7493E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

3rd Embodiment

| | |
|---|---|
| f [mm] | 4.12 |
| Fno | 1.43 |
| HFOV [deg.] | 34.8 |
| T12/T23 | 0.08 |
| |Sag42|/CT4 | 1.60 |
| EPD/CT2 | 12.00 |

-continued

3rd Embodiment

| | | | |
|---|---|---|---|
| Td/EPD | 1.58 | SD62/EPD | 0.86 |
| N1 | 1.544 | (R5 + R6)/(R5 − R6) | −0.12 |
| V4 | 23.5 | (f/R5) + (f/R6) | 0.22 |
| CT1/CT2 | 2.68 | f/R10 | 1.35 |
| CT3/CT1 | 1.18 | f1/f2 | −0.67 |
| CT3/(CT2 + CT4) | 1.41 | f1/f3 | 1.46 |

4th Embodiment

Figure 7:
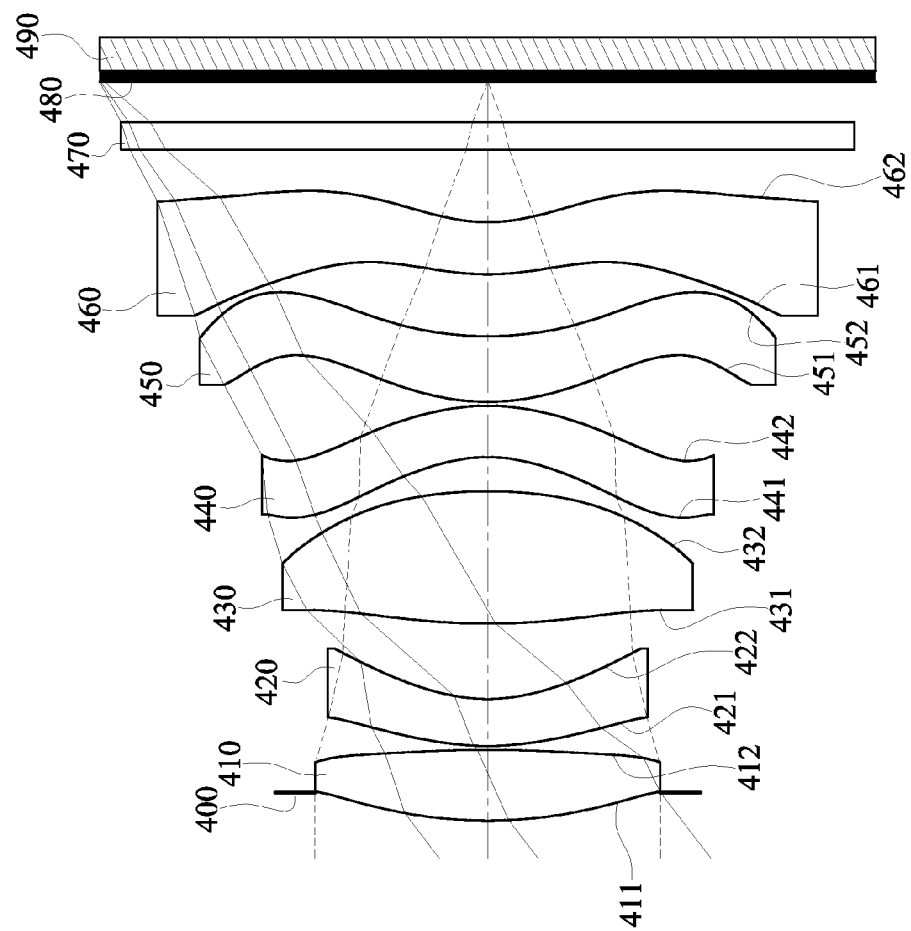
FIG. 7 is a schematic view of an image capturing unit according to the 4th embodiment of the present disclosure.
Figure 8:
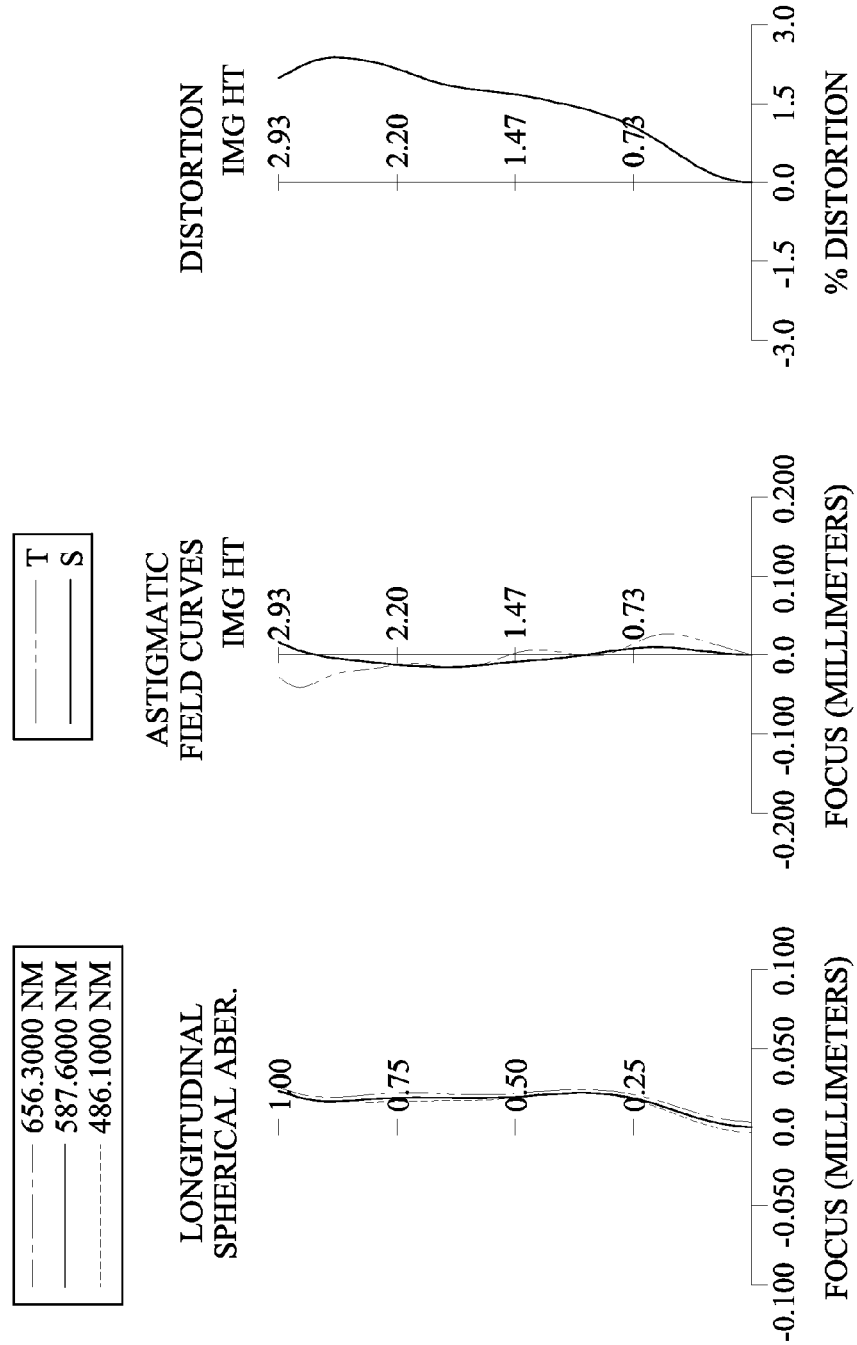
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging system (its reference numeral is omitted) of the present disclosure and an image sensor 490. The optical imaging system includes, in order from an object side to an image side, an aperture stop 400, a first lens element 410, a second lens element 420, a third lens element 430, a fourth lens element 440, a fifth lens element 450, a sixth lens element 460, an IR-cut filter 470 and an image surface 480, wherein the optical imaging system has a total of six non-cemented lens elements (410-460) with refractive power. There is an air gap in a paraxial region between every two of the first lens element 410, the second lens element 420, the third lens element 430, the fourth lens element 440, the fifth lens element 450 and the sixth lens element 460 that are adjacent to each other. The first lens element 410, the second lens element 420, the third lens element 430, the fourth lens element 440, the fifth lens element 450 and the sixth lens element 460 are all stationary relative to one another in a paraxial region thereof.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with positive refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric.

The sixth lens element 460 with negative refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The image-side surface 462 of the sixth lens element 460 has at least one convex shape in an off-axis region thereof.

The IR-cut filter 470 is made of glass and located between the sixth lens element 460 and the image surface 480, and will not affect the focal length of the optical imaging system. The image sensor 490 is disposed on or near the image surface 480 of the optical imaging system.

The detailed optical data of the 4th embodiment are shown in Table 7 and the aspheric surface data are shown in Table 8 below.

TABLE 7

4th Embodiment
f = 3.75 mm, Fno = 1.43, HFOV = 37.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.213 | | | | |
| 2 | Lens 1 | 3.553 (ASP) | 0.536 | Plastic | 1.544 | 55.9 | 4.71 |
| 3 | | −8.705 (ASP) | 0.030 | | | | |
| 4 | Lens 2 | 2.150 (ASP) | 0.356 | Plastic | 1.639 | 23.5 | −6.31 |
| 5 | | 1.312 (ASP) | 0.572 | | | | |
| 6 | Lens 3 | 5.001 (ASP) | 1.004 | Plastic | 1.544 | 55.9 | 3.83 |
| 7 | | −3.322 (ASP) | 0.259 | | | | |
| 8 | Lens 4 | −1.141 (ASP) | 0.390 | Plastic | 1.639 | 23.5 | −10.57 |
| 9 | | −1.556 (ASP) | 0.030 | | | | |
| 10 | Lens 5 | 1.806 (ASP) | 0.497 | Plastic | 1.544 | 55.9 | 9.33 |
| 11 | | 2.531 (ASP) | 0.469 | | | | |
| 12 | Lens 6 | 1.875 (ASP) | 0.396 | Plastic | 1.639 | 23.5 | −8.40 |
| 13 | | 1.275 (ASP) | 0.550 | | | | |
| 14 | IR-cut filter | Plano | 0.210 | Glass | 1.517 | 64.2 | — |
| 15 | | Plano | 0.305 | | | | |
| 16 | Image | Plano | — | | | | |

Note:
Reference wavelength is 587.6 nm (d-line).
Effective radius of Surface 12 is 2.220 mm.

TABLE 8

Aspheric Coefficients

| Surface # | 2 | 3 | 4 | 5 | 6 | 7 |
|---|---|---|---|---|---|---|
| k = | 1.8028E+00 | −6.8551E+01 | −6.9276E+00 | −3.5825E+00 | −8.5234E+01 | −2.7091E+01 |
| A4 = | 4.8738E−03 | −2.4420E−03 | −5.4730E−02 | −1.8265E−02 | 6.2719E−02 | −9.7205E−02 |
| A6 = | −2.7187E−02 | 5.1257E−02 | 1.2146E−01 | 5.1118E−02 | −9.9097E−02 | 6.6829E−02 |
| A8 = | 3.5701E−02 | −7.0041E−02 | −1.3676E−01 | −3.8449E−02 | 9.4450E−02 | −1.1242E−01 |
| A10 = | −3.1913E−02 | 4.0310E−02 | 8.1557E−02 | 1.0835E−02 | −6.0420E−02 | 1.1257E−01 |
| A12 = | 1.4724E−02 | −1.2744E−02 | −2.8298E−02 | −9.2118E−04 | 2.0188E−02 | −5.7183E−02 |
| A14 = | −3.1989E−03 | 1.3828E−03 | 4.1282E−03 | −3.5107E−05 | −2.5780E−03 | 1.4247E−02 |
| A16 = | — | — | — | — | — | −1.4035E−03 |

| Surface # | 8 | 9 | 10 | 11 | 12 | 13 |
|---|---|---|---|---|---|---|
| k = | −1.3694E+00 | −8.7288E+00 | −1.1653E+00 | −3.7048E+01 | −1.6952E+00 | −7.9306E−01 |
| A4 = | 2.7087E−01 | −1.8232E−02 | 2.6201E−03 | 1.8179E−01 | −2.2537E−01 | −2.8397E−01 |
| A6 = | −3.8125E−01 | −8.9681E−02 | −4.6210E−02 | −1.3546E−01 | 6.7424E−02 | 1.1748E−01 |
| A8 = | 3.1211E−01 | 1.0527E−01 | 2.0739E−02 | 4.6526E−02 | −8.3253E−03 | −3.9992E−02 |
| A10 = | −1.3062E−01 | −4.7887E−02 | −7.7998E−03 | −9.6134E−03 | 1.1293E−03 | 9.8257E−03 |
| A12 = | 2.7996E−02 | 1.1137E−02 | 1.6257E−03 | 1.0797E−03 | −5.4396E−04 | −1.5457E−03 |
| A14 = | −2.4721E−03 | −1.0698E−03 | −1.2185E−04 | −5.0109E−05 | 1.1512E−04 | 1.3454E−04 |
| A16 = | — | — | — | — | −7.7869E−06 | −4.9308E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.75 | T12/T23 | 0.05 |
| Fno | 1.43 | \|Sag42\|/CT4 | 0.97 |
| HFOV [deg.] | 37.4 | EPD/CT2 | 7.37 |
| Td/EPD | 1.73 | SD62/EPD | 0.95 |
| N1 | 1.544 | (R5 + R6)/(R5 − R6) | 0.20 |
| V4 | 23.5 | (f/R5) + (f/R6) | −0.38 |
| CT1/CT2 | 1.51 | f/R10 | 1.48 |
| CT3/CT1 | 1.87 | f1/f2 | −0.75 |
| CT3/(CT2 + CT4) | 1.35 | f1/f3 | 1.23 |

5th Embodiment

Figure 9:
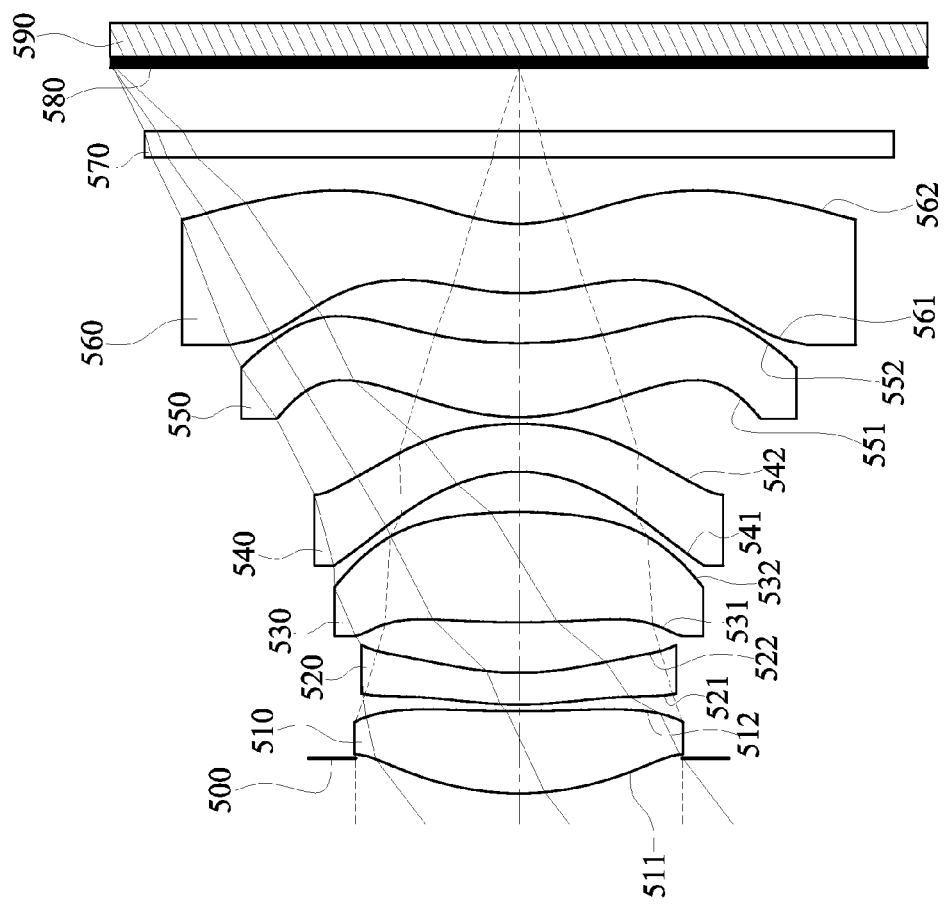
FIG. 9 is a schematic view of an image capturing unit according to the 5th embodiment of the present disclosure.
Figure 10:
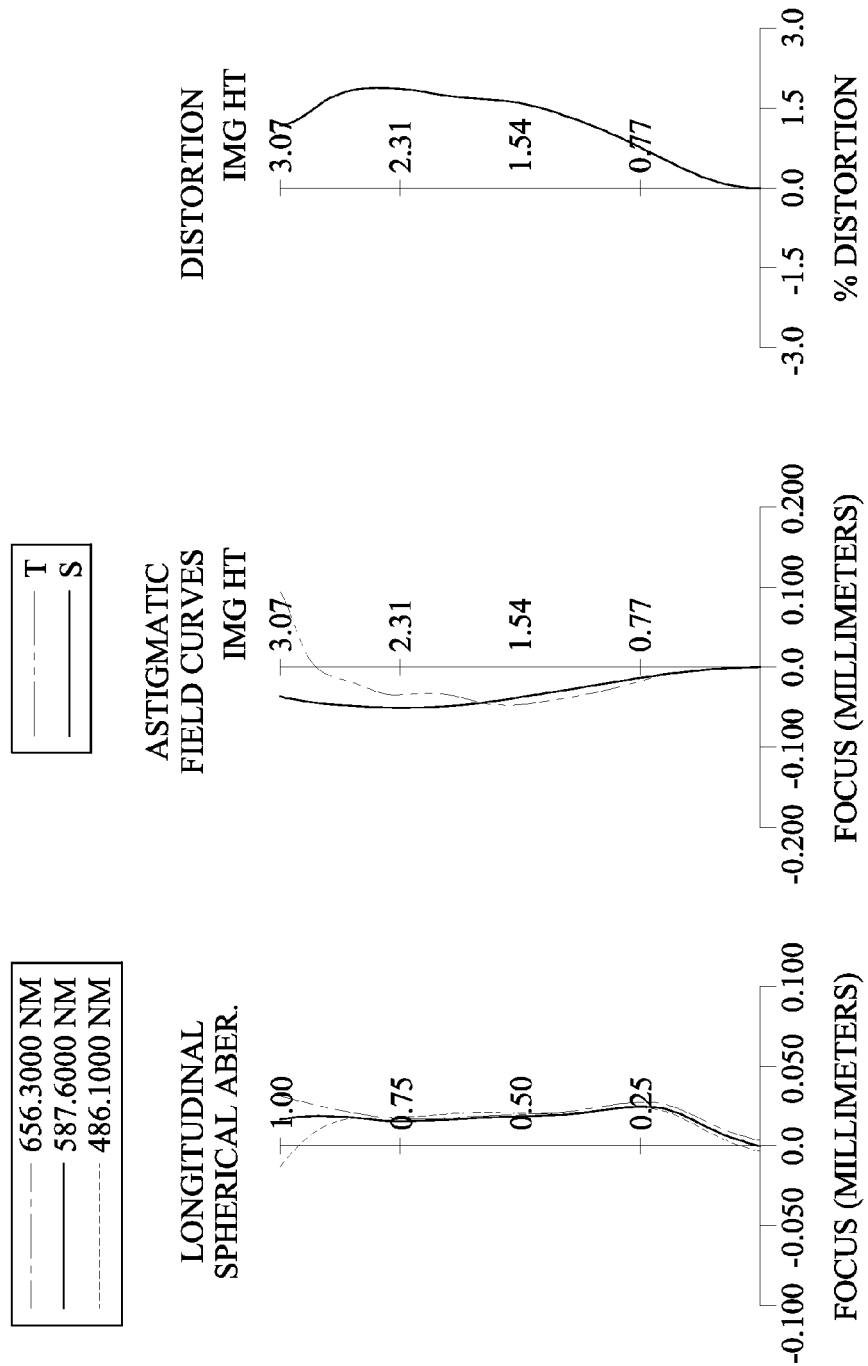
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging system (its reference numeral is omitted) of the present disclosure and an image sensor 590. The optical imaging system includes, in order from an object side to an image side, an aperture stop 500, a first lens element 510, a second lens element 520, a third lens element 530, a fourth lens element 540, a fifth lens element 550, a sixth lens element 560, an IR-cut filter 570 and an image surface 580, wherein the optical imaging system has a total of six non-cemented lens elements (510-560) with refractive power. There is an air gap in a paraxial region between every two of the first lens element 510, the second lens element 520, the third lens element 530, the fourth lens element 540, the fifth lens element 550 and the sixth lens element 560 that are adjacent to each other. The first lens element 510, the second lens element 520, the third lens element 530, the fourth lens element 540, the fifth lens element 550 and the sixth lens element 560 are all stationary relative to one another in a paraxial region thereof.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric.

The fourth lens element 540 with negative refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with positive refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The image-side surface 562 of the sixth lens element 560 has at least one convex shape in an off-axis region thereof.

The IR-cut filter 570 is made of glass and located between the sixth lens element 560 and the image surface 580, and will not affect the focal length of the optical imaging system. The image sensor 590 is disposed on or near the image surface 580 of the optical imaging system.

The detailed optical data of the 5th embodiment are shown in Table 9 and the aspheric surface data are shown in Table 10 below.

Moreover, these parameters can be calculated from Table 9 and Table 10 as the following values and satisfy the following conditions:

| 5th Embodiment | | | |
|---|---|---|---|
| f [mm] | 3.96 | T12/T23 | 0.13 |
| Fno | 1.60 | \|Sag42\|/CT4 | 1.48 |
| HFOV [deg.] | 37.3 | EPD/CT2 | 10.31 |

TABLE 9

5th Embodiment
f = 3.96 mm, Fno = 1.60, HFOV = 37.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.266 | | | | |
| 2 | Lens 1 | 2.246 (ASP) | 0.621 | Plastic | 1.544 | 55.9 | 5.50 |
| 3 | | 8.113 (ASP) | 0.050 | | | | |
| 4 | Lens 2 | 2.852 (ASP) | 0.240 | Plastic | 1.639 | 23.5 | −14.22 |
| 5 | | 2.100 (ASP) | 0.382 | | | | |
| 6 | Lens 3 | 6.746 (ASP) | 0.835 | Plastic | 1.544 | 55.9 | 4.84 |
| 7 | | −4.127 (ASP) | 0.306 | | | | |
| 8 | Lens 4 | −1.091 (ASP) | 0.363 | Plastic | 1.639 | 23.5 | −4.04 |
| 9 | | −2.132 (ASP) | 0.050 | | | | |
| 10 | Lens 5 | 1.639 (ASP) | 0.561 | Plastic | 1.544 | 55.9 | 5.04 |
| 11 | | 3.586 (ASP) | 0.378 | | | | |
| 12 | Lens 6 | 1.631 (ASP) | 0.526 | Plastic | 1.535 | 55.7 | −15.76 |
| 13 | | 1.213 (ASP) | 0.500 | | | | |
| 14 | IR-cut filter | Plano | 0.200 | Glass | 1.517 | 64.2 | — |
| 15 | | Plano | 0.480 | | | | |
| 16 | Image | Plano | — | | | | |

Note:
Reference wavelength is 587.6 nm (d-line).
Effective radius of Surface 5 is 1.190 mm.

TABLE 10

Aspheric Coefficients

| Surface # | 2 | 3 | 4 | 5 | 6 | 7 |
|---|---|---|---|---|---|---|
| k = | 1.2383E−01 | −8.2003E+01 | −6.1939E+01 | −2.7192E+01 | −8.5234E+01 | −8.9837E+00 |
| A4 = | −1.2627E−04 | −3.2170E−02 | 1.1959E−01 | 1.9561E−01 | 2.8233E−03 | −6.8618E−02 |
| A6 = | −5.4099E−03 | −7.8068E−02 | −5.1951E−01 | −5.4167E−01 | −8.8943E−02 | 5.4958E−03 |
| A8 = | −3.3894E−03 | 1.4478E−01 | 7.8862E−01 | 7.2816E−01 | 4.8739E−02 | −6.3931E−02 |
| A10 = | −2.9169E−03 | −1.4606E−01 | −6.5743E−01 | −5.5021E−01 | −1.5793E−02 | 3.8001E−02 |
| A12 = | 1.7372E−03 | 7.1185E−02 | 2.9922E−01 | 2.1492E−01 | −3.3630E−02 | 2.0096E−03 |
| A14 = | −2.0834E−03 | −1.4082E−02 | −5.5680E−02 | −2.9301E−02 | 2.1942E−02 | −5.5167E−03 |
| A16 = | — | — | — | — | — | 8.5003E−04 |

| Surface # | 8 | 9 | 11 | 10 | 12 | 13 |
|---|---|---|---|---|---|---|
| k = | −9.3403E−01 | −8.7134E+00 | −3.7048E+01 | −3.6705E+00 | −1.6416E+00 | −9.8085E−01 |
| A4 = | 1.5424E−01 | −1.4104E−01 | 1.5697E−01 | −1.5829E−02 | −2.7883E−01 | −2.9834E−01 |
| A6 = | −2.3427E−01 | 1.5610E−02 | −1.6055E−01 | −1.7644E−02 | 1.0724E−01 | 1.4680E−01 |
| A8 = | 1.7759E−01 | 4.7887E−02 | 7.9375E−02 | 4.3093E−03 | −2.6049E−02 | −5.6894E−02 |
| A10 = | −4.0767E−02 | −1.7510E−02 | −2.5472E−02 | −9.7069E−04 | 1.5287E−03 | 1.4982E−02 |
| A12 = | −7.0594E−03 | −2.1021E−03 | 4.4850E−03 | −2.8992E−04 | 1.0571E−03 | −2.3895E−03 |
| A14 = | 3.0905E−03 | 1.3355E−03 | −3.1635E−04 | 9.3386E−05 | −2.4600E−04 | 2.0530E−04 |
| A16 = | — | — | — | — | 1.5705E−05 | −7.2541E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

-continued

| 5th Embodiment | | | |
|---|---|---|---|
| Td/EPD | 1.74 | SD62/EPD | 1.03 |
| N1 | 1.544 | (R5 + R6)/(R5 − R6) | 0.24 |
| V4 | 23.5 | (f/R5) + (f/R6) | −0.37 |

-continued

| 5th Embodiment | | | |
|---|---|---|---|
| CT1/CT2 | 2.59 | f/R10 | 1.10 |
| CT3/CT1 | 1.34 | f1/f2 | −0.39 |
| CT3/(CT2 + CT4) | 1.38 | f1/f3 | 1.14 |

6th Embodiment

Figure 11:
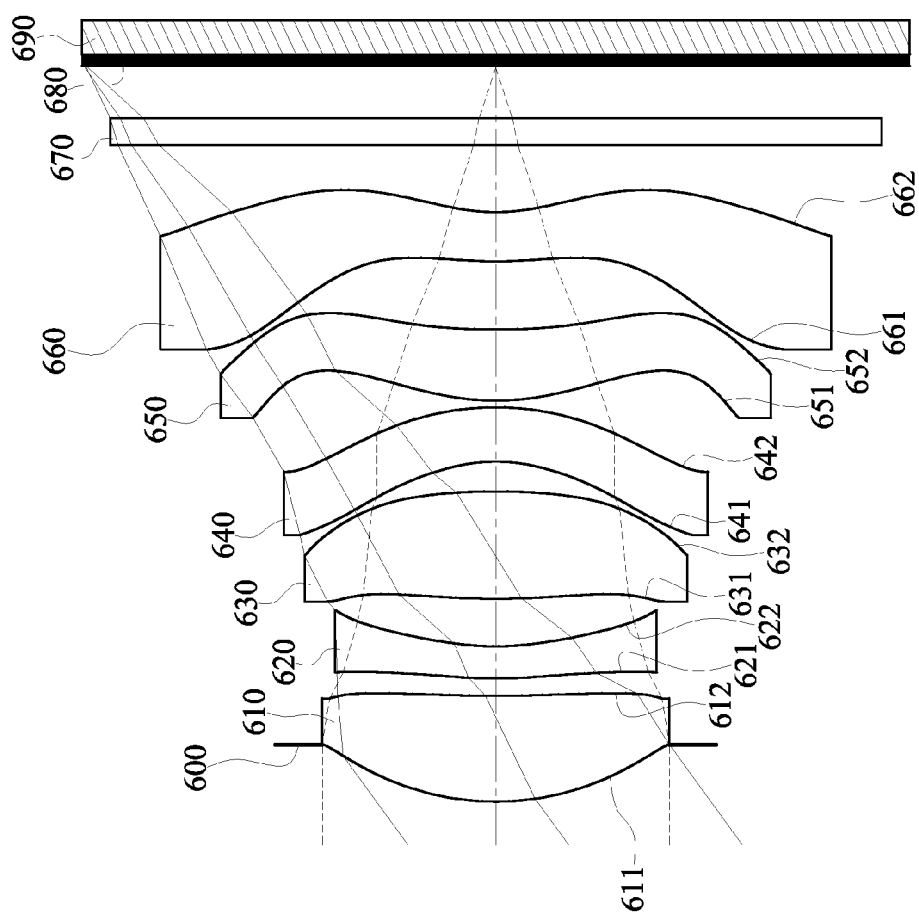
FIG. 11 is a schematic view of an image capturing unit according to the 6th embodiment of the present disclosure.
Figure 12:
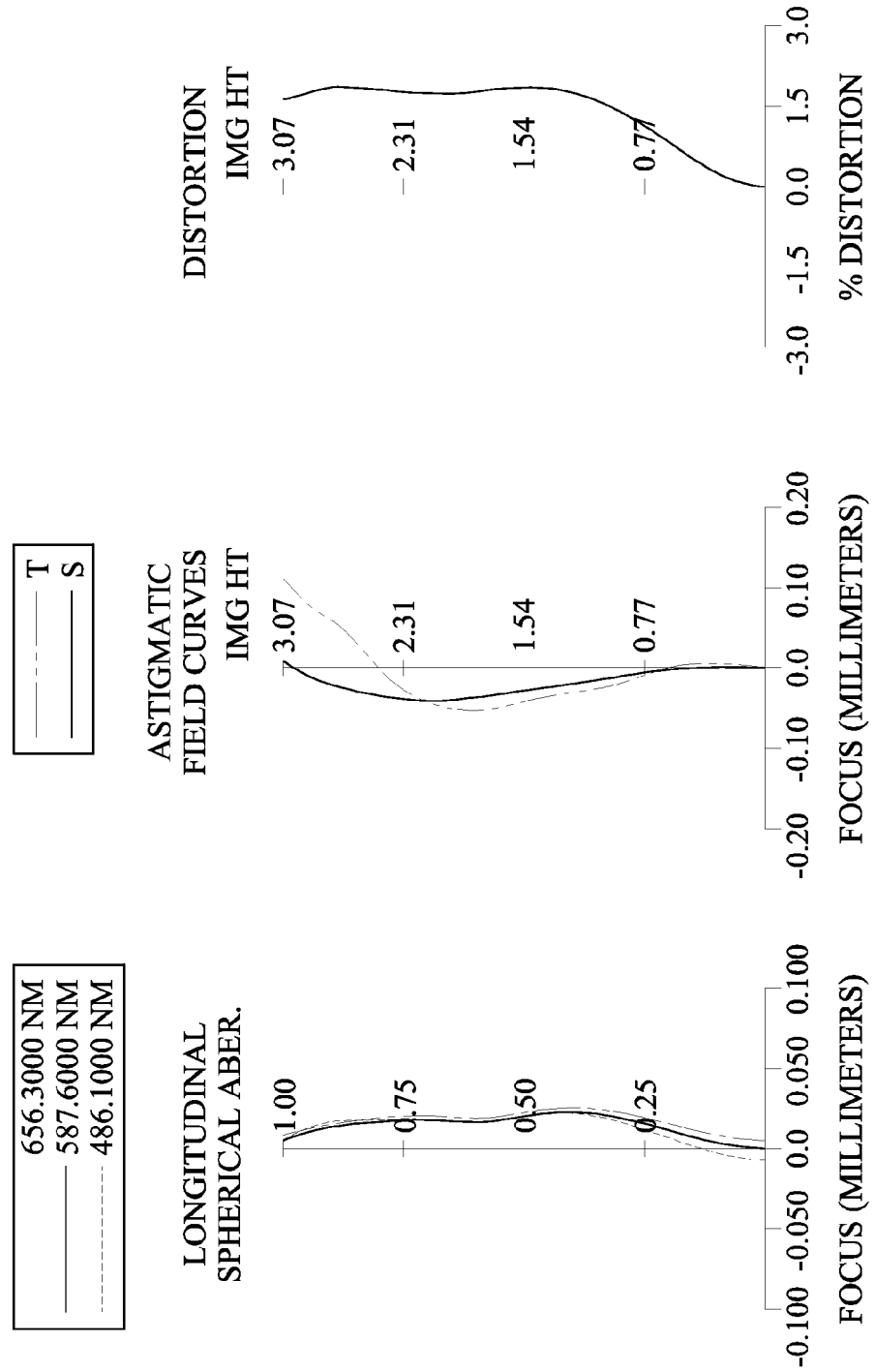
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging system (its reference numeral is omitted) of the present disclosure and an image sensor 690. The optical imaging system includes, in order from an object side to an image side, an aperture stop 600, a first lens element 610, a second lens element 620, a third lens element 630, a fourth lens element 640, a fifth lens element 650, a sixth lens element 660, an IR-cut filter 670 and an image surface 680, wherein the optical imaging system has a total of six non-cemented lens elements (610-660) with refractive power. There is an air gap in a paraxial region between every two of the first lens element 610, the second lens element 620, the third lens element 630, the fourth lens element 640, the fifth lens element 650 and the sixth lens element 660 that are adjacent to each other. The first lens element 610, the second lens element 620, the third lens element 630, the fourth lens element 640, the fifth lens element 650 and the sixth lens element 660 are all stationary relative to one another in a paraxial region thereof.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with negative refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with positive refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric.

The sixth lens element 660 with negative refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The image-side surface 662 of the sixth lens element 660 has at least one convex shape in an off-axis region thereof.

The IR-cut filter 670 is made of glass and located between the sixth lens element 660 and the image surface 680, and will not affect the focal length of the optical imaging system. The image sensor 690 is disposed on or near the image surface 680 of the optical imaging system.

The detailed optical data of the 6th embodiment are shown in Table 11 and the aspheric surface data are shown in Table 12 below.

TABLE 11

6th Embodiment
f = 4.14 mm, Fno = 1.60, HFOV = 36.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.426 | | | | |
| 2 | Lens 1 | 2.037 (ASP) | 0.788 | Plastic | 1.544 | 55.9 | 4.96 |
| 3 | | 7.177 (ASP) | 0.130 | | | | |
| 4 | Lens 2 | 2.953 (ASP) | 0.240 | Plastic | 1.639 | 23.5 | −9.54 |
| 5 | | 1.926 (ASP) | 0.356 | | | | |
| 6 | Lens 3 | 5.425 (ASP) | 0.801 | Plastic | 1.544 | 55.9 | 4.75 |
| 7 | | −4.686 (ASP) | 0.223 | | | | |
| 8 | Lens 4 | −1.211 (ASP) | 0.405 | Plastic | 1.639 | 23.5 | −5.92 |
| 9 | | −2.013 (ASP) | 0.050 | | | | |
| 10 | Lens 5 | 1.856 (ASP) | 0.531 | Plastic | 1.544 | 55.9 | 4.74 |
| 11 | | 5.951 (ASP) | 0.509 | | | | |
| 12 | Lens 6 | 3.209 (ASP) | 0.368 | Plastic | 1.544 | 55.9 | −5.11 |
| 13 | | 1.429 (ASP) | 0.500 | | | | |
| 14 | IR-cut filter | Plano | 0.200 | Glass | 1.517 | 64.2 | — |
| 15 | | Plano | 0.392 | | | | |
| 16 | Image | Plano | — | | | | |

Note:
Reference wavelength is 587.6 nm (d-line).
Effective radius of Surface 5 is 1.200 mm.

TABLE 12

Aspheric Coefficients

| Surface # | 2 | 3 | 4 | 5 | 6 | 7 |
|---|---|---|---|---|---|---|
| k = | 4.3673E−01 | −8.2003E+01 | −6.1939E+01 | −2.7192E+01 | −8.5234E+01 | −8.9837E+00 |
| A4 = | −6.3654E−03 | −9.8283E−02 | −9.1635E−02 | 1.1617E−01 | −6.3146E−04 | −2.6394E−02 |
| A6 = | −1.4976E−02 | 1.6562E−01 | 6.1979E−02 | −3.1879E−01 | −4.6621E−02 | −3.5742E−02 |
| A8 = | 3.7799E−02 | −1.6904E−01 | 4.8808E−02 | 5.7737E−01 | 7.9843E−04 | −4.6971E−02 |
| A10 = | −5.1151E−02 | 9.4078E−02 | −1.0683E−01 | −5.5052E−01 | 4.8951E−02 | 7.6497E−02 |
| A12 = | 3.0701E−02 | −3.1593E−02 | 6.0641E−02 | 2.6645E−01 | −5.9686E−02 | −3.7164E−02 |
| A14 = | −7.6086E−03 | 4.4419E−03 | −1.1772E−02 | −4.9708E−02 | 2.1061E−02 | 6.8630E−03 |
| A16 = | — | — | — | — | — | −3.3060E−04 |

| Surface # | 8 | 9 | 10 | 11 | 12 | 13 |
|---|---|---|---|---|---|---|
| k = | −1.0720E+00 | −7.8423E+00 | −4.3488E+00 | −3.7048E+01 | −5.3596E−01 | −9.2705E−01 |
| A4 = | 2.2887E−01 | −6.3708E−02 | −5.5826E−03 | 1.2716E−01 | −2.4043E−01 | −2.8723E−01 |
| A6 = | −3.2280E−01 | −4.8315E−02 | −4.0364E−02 | −1.5096E−01 | 4.4554E−02 | 1.3317E−01 |
| A8 = | 2.3993E−01 | 8.4326E−02 | 1.9484E−02 | 7.9437E−02 | 1.1472E−02 | −4.9817E−02 |
| A10 = | −7.6319E−02 | −4.2018E−02 | −5.8383E−03 | −2.6545E−02 | −8.4966E−03 | 1.3359E−02 |
| A12 = | 7.8181E−03 | 9.2420E−03 | 1.3587E−04 | 4.7864E−03 | 2.3123E−03 | −2.2304E−03 |
| A14 = | 3.4769E−04 | −6.4952E−04 | 1.3890E−04 | −3.4260E−04 | −3.0687E−04 | 2.0215E−04 |
| A16 = | — | — | — | — | 1.5788E−05 | −7.5380E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.14 | T12/T23 | 0.37 |
| Fno | 1.60 | |Sag42|/CT4 | 1.19 |
| HFOV [deg.] | 36.0 | EPD/CT2 | 10.78 |
| Td/EPD | 1.70 | SD62/EPD | 0.97 |
| N1 | 1.544 | (R5 + R6)/(R5 − R6) | 0.07 |
| V4 | 23.5 | (f/R5) + (f/R6) | −0.12 |
| CT1/CT2 | 3.28 | f/R10 | 0.70 |
| CT3/CT1 | 1.02 | f1/f2 | −0.52 |
| CT3/(CT2 + CT4) | 1.24 | f1/f3 | 1.04 |

7th Embodiment

Figure 13:
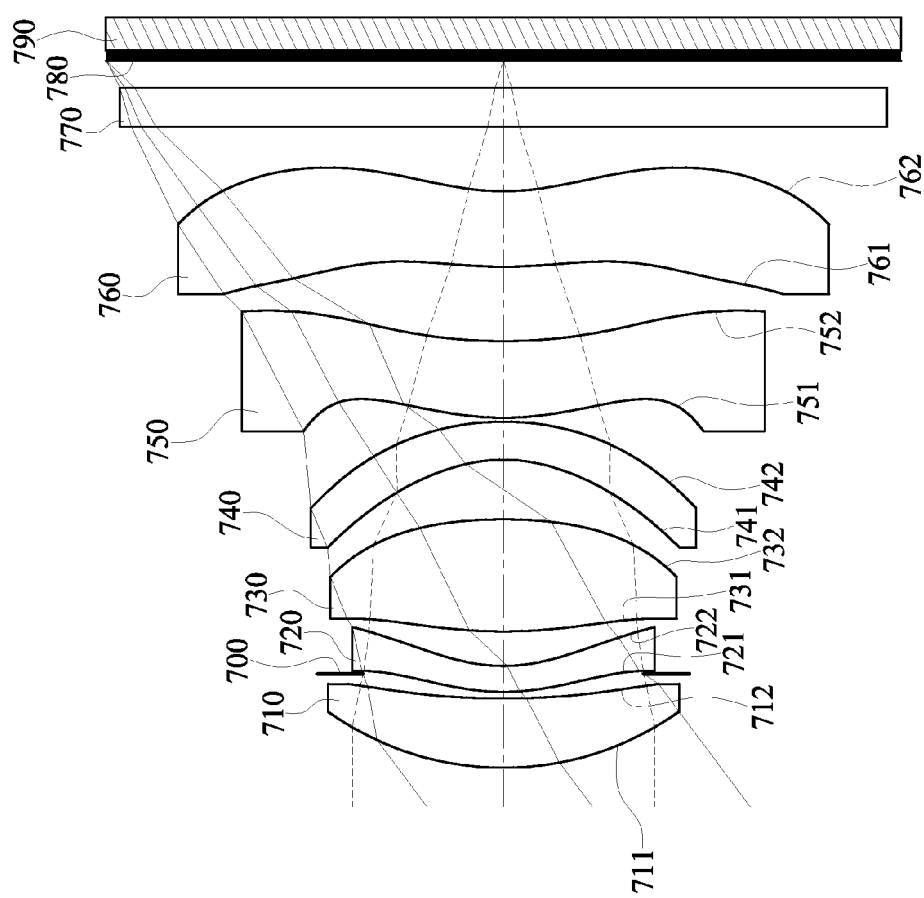
FIG. 13 is a schematic view of an image capturing unit according to the 7th embodiment of the present disclosure.
Figure 14:
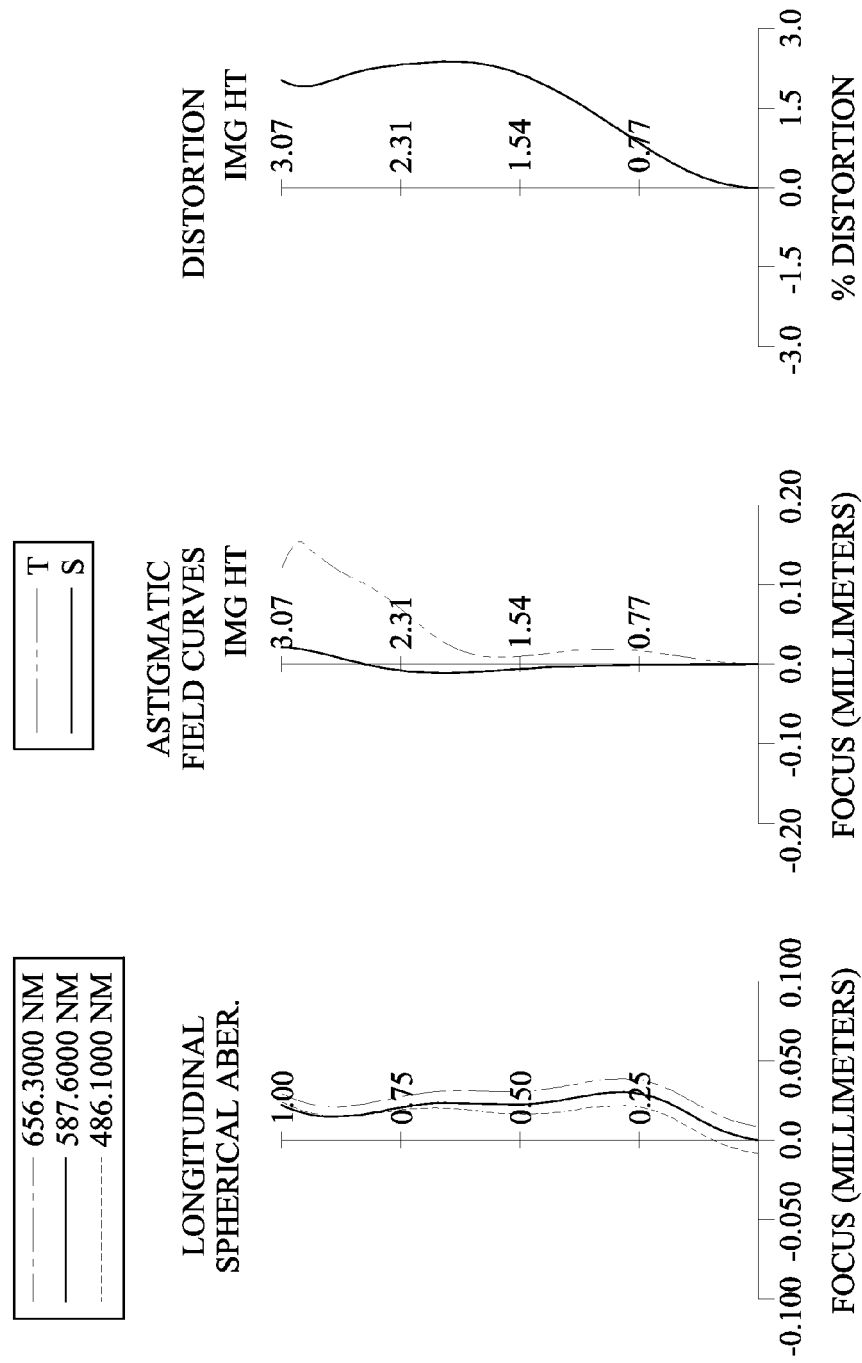
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging system (its reference numeral is omitted) of the present disclosure and an image sensor 790. The optical imaging system includes, in order from an object side to an image side, a first lens element 710, an aperture stop 700, a second lens element 720, a third lens element 730, a fourth lens element 740, a fifth lens element 750, a sixth lens element 760, an IR-cut filter 770 and an image surface 780, wherein the optical imaging system has a total of six non-cemented lens elements (710-760) with refractive power. There is an air gap in a paraxial region between every two of the first lens element 710, the second lens element 720, the third lens element 730, the fourth lens element 740, the fifth lens element 750 and the sixth lens element 760 that are adjacent to each other. The first lens element 710, the second lens element 720, the third lens element 730, the fourth lens element 740, the fifth lens element 750 and the sixth lens element 760 are all stationary relative to one another in a paraxial region thereof.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with negative refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with positive refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric.

The sixth lens element 760 with negative refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The image-side surface 762 of the sixth lens element 760 has at least one convex shape in an off-axis region thereof.

The IR-cut filter 770 is made of glass and located between the sixth lens element 760 and the image surface 780, and will not affect the focal length of the optical imaging system. The image sensor 790 is disposed on or near the image surface 780 of the optical imaging system.

The detailed optical data of the 7th embodiment are shown in Table 13 and the aspheric surface data are shown in Table 14 below.

TABLE 13

7th Embodiment
f = 4.00 mm, Fno = 1.71, HFOV = 36.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.452 (ASP) | 0.537 | Plastic | 1.544 | 55.9 | 6.37 |
| 2 | | 7.734 (ASP) | 0.188 | | | | |
| 3 | Ape. Stop | Plano | −0.138 | | | | |
| 4 | Lens 2 | 1.754 (ASP) | 0.200 | Plastic | 1.650 | 21.4 | −8.20 |
| 5 | | 1.260 (ASP) | 0.268 | | | | |
| 6 | Lens 3 | 3.852 (ASP) | 0.867 | Plastic | 1.555 | 47.5 | 3.50 |
| 7 | | −3.601 (ASP) | 0.461 | | | | |
| 8 | Lens 4 | −1.200 (ASP) | 0.295 | Plastic | 1.650 | 21.4 | −5.36 |
| 9 | | −2.008 (ASP) | 0.030 | | | | |
| 10 | Lens 5 | 2.239 (ASP) | 0.593 | Plastic | 1.634 | 23.8 | 6.46 |
| 11 | | 4.434 (ASP) | 0.575 | | | | |
| 12 | Lens 6 | 3.401 (ASP) | 0.584 | Plastic | 1.634 | 23.8 | −7.44 |
| 13 | | 1.845 (ASP) | 0.500 | | | | |
| 14 | IR-cut filter | Plano | 0.300 | Glass | 1.517 | 64.2 | — |
| 15 | | Plano | 0.207 | | | | |
| 16 | Image | Plano | — | | | | |

Note:
Reference wavelength is 587.6 nm (d-line).

TABLE 14

Aspheric Coefficients

| Surface # | 1 | 2 | 4 | 5 | 6 | 7 |
|---|---|---|---|---|---|---|
| k = | 1.0780E+00 | 2.0038E+01 | −1.3555E+01 | −7.1014E+00 | −9.0000E+01 | −3.2121E+01 |
| A4 = | 1.4370E−02 | 6.7037E−02 | 1.3203E−01 | 1.4971E−01 | 1.2574E−01 | −1.3609E−01 |
| A6 = | −2.9104E−02 | −1.0926E−01 | −3.4814E−01 | −3.4678E−01 | −2.1687E−01 | 9.7155E−02 |
| A8 = | 2.7003E−02 | 8.3041E−02 | 3.3280E−01 | 3.5053E−01 | 2.0372E−01 | −1.1792E−01 |
| A10 = | −1.8844E−02 | −3.8652E−02 | −1.7877E−01 | −2.0411E−01 | −1.3455E−01 | 9.4508E−02 |
| A12 = | 6.4442E−03 | 9.2744E−03 | 5.1405E−02 | 6.5817E−02 | 4.8501E−02 | −4.6560E−02 |
| A14 = | −9.0366E−04 | −9.7086E−04 | −6.8829E−03 | −9.0148E−03 | −6.5029E−03 | 1.2717E−02 |
| A16 = | — | — | — | — | — | −1.5192E−03 |

| Surface # | 8 | 9 | 10 | 11 | 12 | 13 |
|---|---|---|---|---|---|---|
| k = | −9.1421E−01 | −9.3338E+00 | −4.4845E+00 | −3.7048E+01 | 3.9434E−01 | −5.3243E−01 |
| A4 = | 1.5482E−01 | −1.1284E−01 | −6.2616E−02 | 8.5093E−02 | −1.5719E−01 | −1.6989E−01 |
| A6 = | −2.1539E−01 | 2.5685E−02 | 4.1581E−02 | −6.3026E−02 | 3.6965E−02 | 5.9004E−02 |
| A8 = | 1.8168E−01 | 2.8320E−04 | −5.4782E−02 | 1.8953E−02 | 1.3330E−03 | −1.7816E−02 |
| A10 = | −8.6497E−02 | 1.1809E−03 | 2.9312E−02 | −2.6372E−03 | −2.0212E−03 | 3.6653E−03 |
| A12 = | 2.0693E−02 | −3.0383E−03 | −9.8357E−03 | 8.6619E−05 | 3.6010E−04 | −4.8759E−04 |
| A14 = | −1.8289E−03 | 8.4999E−04 | 1.3817E−03 | 1.0055E−05 | −3.6491E−05 | 3.7404E−05 |
| A16 = | — | — | — | — | 2.2746E−06 | −1.3372E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.00 | T12/T23 | 0.19 |
| Fno | 1.71 | |Sag42|/CT4 | 2.27 |
| HFOV [deg.] | 36.8 | EPD/CT2 | 11.70 |

-continued

| 7th Embodiment | | | |
|---|---|---|---|
| Td/EPD | 1.91 | SD62/EPD | 1.08 |
| N1 | 1.544 | (R5 + R6)/(R5 − R6) | 0.03 |
| V4 | 21.4 | (f/R5) + (f/R6) | −0.07 |
| CT1/CT2 | 2.69 | f/R10 | 0.90 |

-continued

| | 7th Embodiment | | | |
|---|---|---|---|---|
| CT3/CT1 | 1.61 | f1/f2 | −0.78 | |
| CT3/(CT2 + CT4) | 1.75 | f1/f3 | 1.82 | |

8th Embodiment

Figure 15:
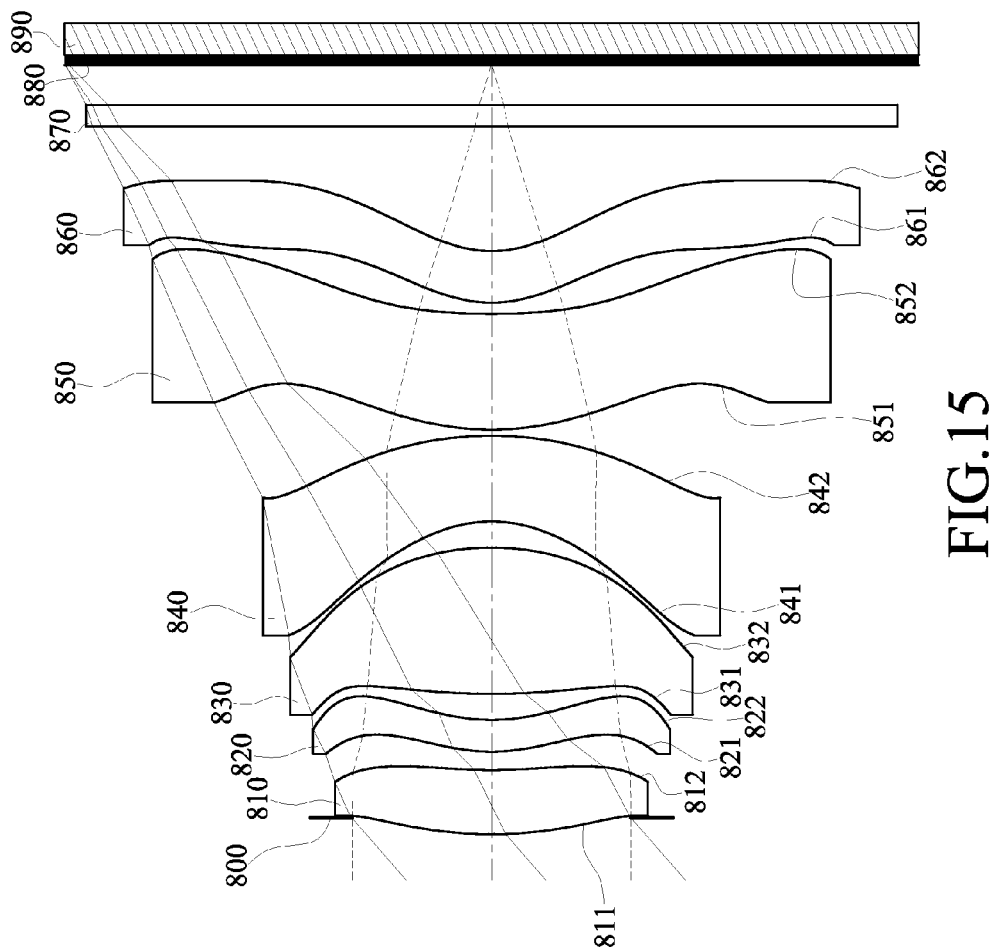
FIG. 15 is a schematic view of an image capturing unit according to the 8th embodiment of the present disclosure.
Figure 16:
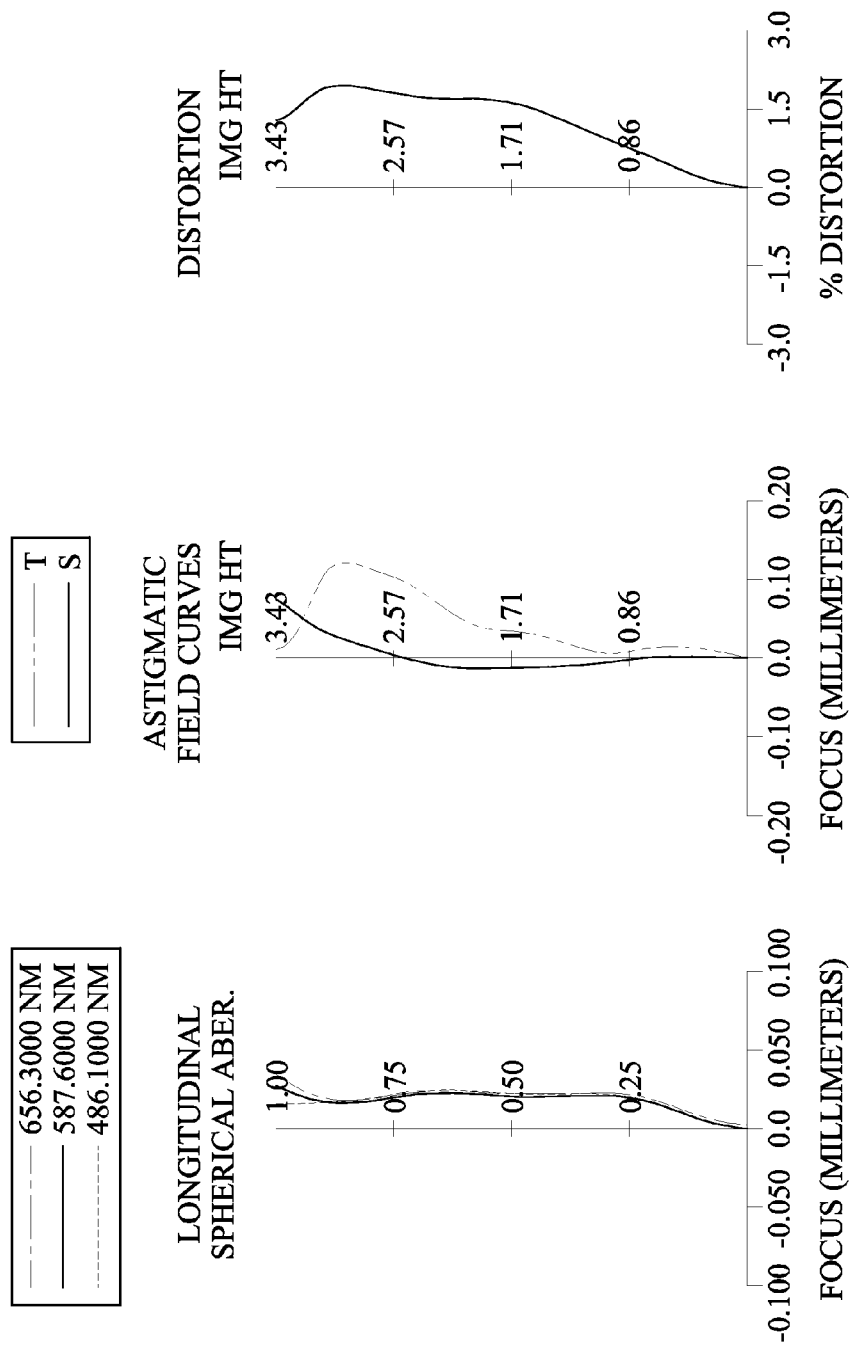
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging system (its reference numeral is omitted) of the present disclosure and an image sensor 890. The optical imaging system includes, in order from an object side to an image side, an aperture stop 800, a first lens element 810, a second lens element 820, a third lens element 830, a fourth lens element 840, a fifth lens element 850, a sixth lens element 860, an IR-cut filter 870 and an image surface 880, wherein the optical imaging system has a total of six non-cemented lens elements (810-860) with refractive power. There is an air gap in a paraxial region between every two of the first lens element 810, the second lens element 820, the third lens element 830, the fourth lens element 840, the fifth lens element 850 and the sixth lens element 860 that are adjacent to each other. The first lens element 810, the second lens element 820, the third lens element 830, the fourth lens element 840, the fifth lens element 850 and the sixth lens element 860 are all stationary relative to one another in a paraxial region thereof.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with positive refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with negative refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with positive refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric.

The sixth lens element 860 with positive refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The image-side surface 862 of the sixth lens element 860 has at least one convex shape in an off-axis region thereof.

The IR-cut filter 870 is made of glass and located between the sixth lens element 660 and the image surface 880, and will not affect the focal length of the optical imaging system. The image sensor 890 is disposed on or near the image surface 680 of the optical imaging system.

The detailed optical data of the 8th embodiment are shown in Table 15 and the aspheric surface data are shown in Table 16 below.

TABLE 15

8th Embodiment
f = 3.86 mm, Fno = 1.72, HFOV = 41.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.132 | | | | |
| 2 | Lens 1 | 3.247 (ASP) | 0.517 | Plastic | 1.544 | 55.9 | 25.32 |
| 3 | | 4.010 (ASP) | 0.147 | | | | |
| 4 | Lens 2 | 1.464 (ASP) | 0.255 | Plastic | 1.544 | 55.9 | 24.58 |
| 5 | | 1.543 (ASP) | 0.210 | | | | |
| 6 | Lens 3 | 5.557 (ASP) | 1.175 | Plastic | 1.544 | 55.9 | 3.00 |
| 7 | | −2.143 (ASP) | 0.210 | | | | |
| 8 | Lens 4 | −1.078 (ASP) | 0.689 | Plastic | 1.639 | 23.5 | −3.10 |
| 9 | | −2.958 (ASP) | 0.050 | | | | |
| 10 | Lens 5 | 2.343 (ASP) | 0.931 | Plastic | 1.544 | 55.9 | 6.24 |
| 11 | | 6.506 (ASP) | 0.089 | | | | |
| 12 | Lens 6 | 1.046 (ASP) | 0.414 | Plastic | 1.544 | 55.9 | 75.61 |
| 13 | | 0.923 (ASP) | 1.000 | | | | |
| 14 | IR-cut filter | Plano | 0.175 | Glass | 1.517 | 64.2 | — |
| 15 | | Plano | 0.320 | | | | |
| 16 | Image | Plano | — | | | | |

Note:
Reference wavelength is 587.6 nm (d-line).

TABLE 16

Aspheric Coefficients

| Surface # | 2 | 3 | 4 | 5 | 6 | 7 |
|---|---|---|---|---|---|---|
| k = | −4.6740E−01 | −7.5978E+01 | −1.0679E+01 | −8.4885E+00 | −4.0891E+01 | −1.4297E+00 |
| A4 = | −9.1022E−03 | −4.9171E−02 | 7.9086E−02 | 1.1450E−01 | 1.0609E−02 | −5.6803E−02 |
| A6 = | −1.2258E−02 | −2.8958E−02 | −3.4458E−01 | −3.1604E−01 | −3.5046E−02 | 2.2621E−02 |
| A8 = | 6.0037E−03 | 4.2349E−02 | 3.6304E−01 | 3.3422E−01 | 4.4700E−02 | −2.9164E−02 |
| A10 = | −7.2170E−03 | −4.8270E−02 | −2.4519E−01 | −2.1596E−01 | −2.4152E−02 | 1.1846E−02 |
| A12 = | 5.1849E−04 | 2.1462E−02 | 9.0216E−02 | 6.4798E−02 | −1.0138E−02 | 2.5045E−04 |
| A14 = | −5.0511E−04 | −3.4142E−03 | −1.3500E−02 | −7.1040E−03 | 5.3198E−03 | −1.0165E−03 |
| A16 = | — | — | — | — | — | 1.6580E−04 |

| Surface # | 8 | 9 | 10 | 11 | 12 | 13 |
|---|---|---|---|---|---|---|
| k = | −9.5093E−01 | −1.0448E+01 | −2.6083E+00 | −4.6897E+01 | −1.0721E+00 | −1.0634E+00 |
| A4 = | 6.3511E−02 | −7.4030E−02 | 1.2954E−02 | 9.7065E−02 | −1.9274E−01 | −2.3406E−01 |
| A6 = | 4.9946E−03 | 4.8369E−02 | −2.0207E−02 | −4.3129E−02 | 3.7674E−02 | 7.5334E−02 |
| A8 = | −4.9633E−02 | −2.8593E−02 | 8.1548E−03 | 8.9991E−03 | −3.0942E−03 | −1.7769E−02 |
| A10 = | 3.3690E−02 | 1.1737E−02 | −3.0324E−03 | −1.0508E−03 | 3.2262E−04 | 2.9066E−03 |
| A12 = | −7.4777E−03 | −2.5603E−03 | 5.6558E−04 | 6.9145E−05 | −9.4810E−05 | −2.9245E−04 |
| A14 = | 4.8543E−04 | 2.4090E−04 | −3.6732E−05 | −2.2239E−06 | 1.3064E−05 | 1.5819E−05 |
| A16 = | — | — | — | — | −6.2291E−07 | −3.4887E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.86 | T12/T23 | 0.70 |
| Fno | 1.72 | |Sag42|/CT4 | 0.72 |
| HFOV [deg.] | 41.1 | EPD/CT2 | 8.80 |
| Td/EPD | 2.09 | SD62/EPD | 1.32 |
| N1 | 1.544 | (R5 + R6)/(R5 − R6) | 0.44 |
| V4 | 23.5 | (f/R5) + (f/R6) | −1.11 |
| CT1/CT2 | 2.03 | f/R10 | 0.59 |
| CT3/CT1 | 2.27 | f1/f2 | 1.03 |
| CT3/(CT2 + CT4) | 1.24 | f1/f3 | 8.44 |

The foregoing image capturing unit is able to be installed in, but not limited to, an electronic device, including smart phones, tablet personal computers and wearable apparatus. According to the present disclosure, the first lens element and the third element both have positive refractive powers so that it is favorable for balancing the arrangement of the refractive power of the optical imaging system so as to reduce the sensitivity of the optical imaging system. Furthermore, the image-side surface of the fifth lens element is concave in the paraxial region thereof so that it is favorable for preventing the surface shape of the fifth lens element from being excessively curved so as to reduce the molding problems. Moreover, the image-side surface of the sixth lens element is concave in the paraxial region thereof and has at least one convex shape in an off-axis region thereof. Therefore, it is favorable for the principal point of the optical imaging system being positioned towards the image side of the optical imaging system so as to reduce the total track length of the optical imaging system, thereby keeping a compact size thereof. Furthermore, it is favorable for correcting the aberration of the off-axis field so as to improve the image quality at the peripheral region. When specific conditions are satisfied, it is favorable for balancing the arrangement of the refractive powers of the first lens element and the third lens element so as to avoid excessive aberration. According to the present disclosure, the optical imaging system satisfies the requirements of a large aperture, a good aberration correction capability and a compact size simultaneously.

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging system comprising, in order from an object side to an image side:

a first lens element with positive refractive power having an object-side surface being convex in a paraxial region thereof;

a second lens element;

a third lens element having positive refractive power;

a fourth lens element;

a fifth lens element having an image-side surface being concave in a paraxial region thereof, wherein both of an object-side surface and the image-side surface of the fifth lens element are aspheric; and a sixth lens element having an image-side surface being concave in a paraxial region thereof, wherein the image-side surface of the sixth lens element has at least one convex shape in an off-axis region thereof, and both of an object-side surface and the image-side surface of the sixth lens element are aspheric;

wherein the optical imaging system has a total of six lens elements, the first lens element, the second lens element, the third lens element, the fourth lens element, the fifth lens element and the sixth lens element are all stationary relative to one another in a paraxial region thereof, an air gap in a paraxial region is between every two of the first lens element, the second lens element, the third lens element, the fourth lens element, the fifth lens element and the sixth lens element that are adjacent to each other, the optical imaging system further comprises a stop located between an imaged object and the third lens element;

wherein a maximum effective radius of the image-side surface of the sixth lens element is SD62, an entrance pupil diameter of the optical imaging system is EPD, a focal length of the first lens element is f1, a focal length of the third lens element is f3, an axial distance between the object-side surface of the first lens element and the image-side surface of the sixth lens element is Td, and the following conditions are satisfied:

$0.6 < SD62/EPD < 1.1$;

$0.80 < f1/f3$; and $Td/EPD < 1.91$.

2. The optical imaging system of claim 1, wherein a refractive index of the first lens element is N1, and the following condition is satisfied:

$1.40 < N1 < 1.65$.

3. The optical imaging system of claim 2, wherein an f-number of the optical imaging system is Fno, and the following condition is satisfied:

$Fno < 1.75$.

4. The optical imaging system of claim 3, wherein a central thickness of the second lens element is CT2, a central thickness of the third lens element is CT3, a central thickness of the fourth lens element is CT4, and the following condition is satisfied:

$1.0 < CT3/(CT2+CT4)$.

5. The optical imaging system of claim 1, wherein the focal length of the first lens element is f1, a focal length of the second lens element is f2, and the following condition is satisfied:

$-1.0 < f1/f2 < 0$.

6. The optical imaging system of claim 5, wherein a curvature radius of an object-side surface of the third lens element is R5, a curvature radius of an image-side surface of the third lens element is R6, and the following condition is satisfied:

$(R5+R6)/(R5-R6) < 0.50$.

7. The optical imaging system of claim 1, wherein the second lens element has negative refractive power, and the fourth lens element has negative refractive power.

8. The optical imaging system of claim 7, wherein a focal length of the optical imaging system is f, a curvature radius of an object-side surface of the third lens element is R5, a curvature radius of an image-side surface of the third lens element is R6, and the following condition is satisfied:

$-1.0 < (f/R5)+(f/R6) < 1.0$.

9. The optical imaging system of claim 7, wherein the fifth lens element has positive refractive power.

10. The optical imaging system of claim 1, wherein the focal length of the first lens element is f1, the focal length of the third lens element is f3, and the following condition is satisfied:

$0.95 < f1/f3$.

11. The optical imaging system of claim 1, wherein an f-number of the optical imaging system is Fno, and the following condition is satisfied:

$Fno < 1.55$.

12. The optical imaging system of claim 1, wherein a focal length of the optical imaging system is f, a curvature radius of the image-side surface of the fifth lens element is R10, and the following condition is satisfied:

$0.55 < f/R10 < 3.0$.

13. The optical imaging system of claim 1, wherein an axial distance between the first lens element and the second lens element is T12, an axial distance between the second lens element and the third lens element is T23, and the following condition is satisfied:

$0 < T12/T23 < 0.50$.

14. The optical imaging system of claim 1, wherein a central thickness of the first lens element is CT1, a central thickness of the third lens element is CT3, and the following condition is satisfied:

$1.16 < CT3/CT1$.

15. The optical imaging system of claim 1, wherein the fourth lens element has an image-side surface being convex in a paraxial region thereof, a distance in parallel with an optical axis from an intersection point of the image-side surface of the fourth lens element and the optical axis to a position of a maximum effective radius of the image-side surface of the fourth lens element is Sag42, a central thickness of the fourth lens element is CT4, and the following condition is satisfied:

$1.40 < |Sag42|/CT4$.

16. The optical imaging system of claim 1, wherein the entrance pupil diameter of the optical imaging system is EPD, a central thickness of the second lens element is CT2, and the following condition is satisfied:

$9.5 < EPD/CT2$.

17. The optical imaging system of claim 1, wherein the first lens element has an image-side surface being concave in a paraxial region thereof.

18. The optical imaging system of claim 1, wherein an Abbe number of the fourth lens element is V4, and the following condition is satisfied:

$V4 < 30$.

19. An image capturing unit, comprising:
the optical imaging system of claim 1; and
an image sensor, wherein the image sensor is disposed on the image side of the optical imaging system.

20. An electronic device, comprising:
the image capturing unit of claim 19.

21. An optical imaging system comprising, in order from an object side to an image side:
a first lens element with positive refractive power having an object-side surface being convex in a paraxial region thereof, and the first lens element is made of plastic material;
a second lens element;

a third lens element with positive refractive power having an image-side surface being convex in a paraxial region thereof;

a fourth lens element;

a fifth lens element having an image-side surface being concave in a paraxial region thereof, wherein both of an object-side surface and the image-side surface of the fifth lens element are aspheric; and a sixth lens element having an image-side surface being concave in a paraxial region thereof, wherein the image-side surface of the sixth lens element has at least one convex shape in an off-axis region thereof, and both of an object-side surface and the image-side surface of the sixth lens element are aspheric;

wherein the optical imaging system has a total of six lens elements, the first lens element, the second lens element, the third lens element, the fourth lens element, the fifth lens element and the sixth lens element are all stationary relative to one another in a paraxial region thereof, an air gap in a paraxial region is between every two of the first lens element, the second lens element, the third lens element, the fourth lens element, the fifth lens element and the sixth lens element that are adjacent to each other, the optical imaging system further comprises a stop located between an imaged object and the third lens element;

wherein a maximum effective radius of the image-side surface of the sixth lens element is SD62, an entrance pupil diameter of the optical imaging system is EPD, a focal length of the optical imaging system is f, a focal length of the first lens element is f1, a focal length of the third lens element is f3, an axial distance between the object-side surface of the first lens element and the image-side surface of the sixth lens element is Td, a curvature radius of an object-side surface of the third lens element is R5, a curvature radius of the image-side surface of the third lens element is R6, a central thickness of the first lens element is CT1, a central thickness of the second lens element is CT2, and the following conditions are satisfied:

0.6<$SD62$/EPD<1.33;

1.04≤$f1$/$f3$;

$Td$/EPD<2.15;

−1.125<($f$/$R5$)+($f$/$R6$);

1.45<CT1/CT2; and 8.25<EPD/CT2.

22. The optical imaging system of claim 21, wherein the focal length of the first lens element is f1, a focal length of the second lens element is f2, and the following condition is satisfied:

−1.0<$f1$/$f2$.

23. The optical imaging system of claim 21, wherein an f-number of the optical imaging system is Fno, and the following condition is satisfied:

Fno<1.75.

24. The optical imaging system of claim 23, wherein the fourth lens element has negative refractive power, and the fifth lens element has positive refractive power.

25. The optical imaging system of claim 23, wherein an axial distance between the first lens element and the second lens element is T12, an axial distance between the second lens element and the third lens element is T23, and the following condition is satisfied:

0<$T12$/$T23$<0.50.

26. The optical imaging system of claim 21, wherein the focal length of the optical imaging system is f, a curvature radius of the image-side surface of the fifth lens element is R10, and the following condition is satisfied:

0.55<$f$/$R10$<3.0.

27. The optical imaging system of claim 21, wherein the fourth lens element has an image-side surface being convex in a paraxial region thereof, a distance in parallel with an optical axis from an intersection point of the image-side surface of the fourth lens element and the optical axis to a position of a maximum effective radius of the image-side surface of the fourth lens element is Sag42, a central thickness of the fourth lens element is CT4, and the following condition is satisfied:

1.40<|$Sag42$|/CT4.

28. The optical imaging system of claim 21, wherein the curvature radius of the object-side surface of the third lens element is R5, the curvature radius of the image-side surface of the third lens element is R6, and the following condition is satisfied:

($R5$+$R6$)/($R5$−$R6$)<0.50.

* * * * *

UNITED STATES PATENT AND TRADEMARK OFFICE
CERTIFICATE OF CORRECTION

PATENT NO. : 9,507,126 B2  
APPLICATION NO. : 14/607213  
DATED : November 29, 2016  
INVENTOR(S) : Tang et al.

Page 1 of 1

It is certified that error appears in the above-identified patent and that said Letters Patent is hereby corrected as shown below:

In the Claims

In Column 35, Claim 1, Line 25, delete "Td/EPD < 1.91" and insert -- *Td/EPD ≤ 1.91* --, therefor.

Signed and Sealed this  
Seventh Day of March, 2017

Michelle K. Lee  
*Director of the United States Patent and Trademark Office*